US012284510B2

(12) United States Patent
Tobisawa

(10) Patent No.: US 12,284,510 B2
(45) Date of Patent: Apr. 22, 2025

(54) METHOD FOR GENERATING STEREOPHONIC SOUND

(71) Applicant: NEXT SOUND INC., Tokyo (JP)

(72) Inventor: Masahito Tobisawa, Tokyo (JP)

(73) Assignee: NEXT SOUND INC. (JP)

( * ) Notice: Subject to any disclaimer, the term of this patent is extended or adjusted under 35 U.S.C. 154(b) by 185 days.

(21) Appl. No.: 18/016,840

(22) PCT Filed: Aug. 5, 2021

(86) PCT No.: PCT/JP2021/029146
§ 371 (c)(1),
(2) Date: Jan. 18, 2023

(87) PCT Pub. No.: WO2022/030587
PCT Pub. Date: Feb. 10, 2022

(65) Prior Publication Data

US 2023/0276191 A1 Aug. 31, 2023

(30) Foreign Application Priority Data

Aug. 7, 2020 (JP) ................................ 2020-135188

(51) Int. Cl.
*H04S 7/00* (2006.01)
*G10K 15/02* (2006.01)
*H04S 1/00* (2006.01)

(52) U.S. Cl.
CPC .............. *H04S 7/307* (2013.01); *G10K 15/02* (2013.01); *H04S 1/007* (2013.01); *H04S 2420/01* (2013.01)

(58) Field of Classification Search
CPC ...... H04S 7/307; H04S 1/007; H04S 2420/01; H04S 2400/01; H04S 1/005; G10K 15/02; H04R 5/04
See application file for complete search history.

(56) References Cited

U.S. PATENT DOCUMENTS 4,347,405 A * 8/1982 Davis ........................ H04S 3/00
381/384
5,521,330 A * 5/1996 Kuwano .................. G10H 1/02
84/DIG. 1
(Continued)

FOREIGN PATENT DOCUMENTS

CA 2778382 A1 * 4/2011 ............ G10L 19/00
JP 6-295175 10/1994
(Continued)

OTHER PUBLICATIONS

Product information on KU100 dummy head being a binaural stereo microphone (http://neumannjapan.com/neumann.user.ItemDetail/id/29.html).

(Continued)

*Primary Examiner* — Oyesola C Ojo
(74) *Attorney, Agent, or Firm* — Harvey S. Kauget; Burr & Forman LLP

(57) ABSTRACT

Provided is a method for generating stereophonic sound. According to one embodiment of the present invention, a phase angle relative to an original sound is controlled by focusing on a rearward sense of localization, which is difficult to express, and using a plurality of delay devices (delay machines) to change the time, phase, and direction thereof. Thereby provided is a technology having the purpose of improving a subjective evaluation in a psychological space by using a rearwardly-localized sound source to emphasize and effectively simulate there actually being a sound source toward the rear.

7 Claims, 24 Drawing Sheets

(56) References Cited

U.S. PATENT DOCUMENTS

| | | | | |
|---|---|---|---|---|
| 6,180,866 | B1 * | 1/2001 | Kitamura | G10H 1/0091 84/630 |
| 2011/0060436 | A1 * | 3/2011 | Gandini | A61M 21/02 700/94 |
| 2011/0154976 | A1 * | 6/2011 | Regie | G09B 15/001 84/477 R |
| 2013/0182862 | A1 * | 7/2013 | Disch | G10H 1/08 381/61 |
| 2016/0125867 | A1 * | 5/2016 | Jarvinen | G10K 11/17857 381/73.1 |
| 2017/0272882 | A1 | 9/2017 | Oh et al. | |

FOREIGN PATENT DOCUMENTS

| | | | | |
|---|---|---|---|---|
| JP | 6-327100 | | 11/1994 | |
| JP | 2000-20083 | | 1/2000 | |
| JP | 2018502535 | A * | 1/2018 | H04S 1/00 |
| JP | A-2018-502535 | | 1/2018 | |

OTHER PUBLICATIONS

Akira Yazawa, Audio field control program (https://jinzaiipedia.ipa.go.jp/mitou_ipedia/wp-content/uploads/2015/10/afb1bdcd7fc58161f6119ffec6939375.pdf).

Yukiko Yamamoto, Emi Nishina, Hitoshi Ohnishi A Research Review on Perception of Consonance and Dissonance—As a Focus on Sensory Consonance—(https://www.jstage.jst.go.jp/article/jcss/22/2/22_282/_pdf/-char/en).

International Search Report—Oct. 26, 2021.

* cited by examiner

<CASE IN WHICH C IS MUSIC KEY>

| | | | | 1 | | 2 | | 3 |
|---|---|---|---|---|---|---|---|---|
| | | FUNDAMENTAL TONE | → | ASCENDING FOURTH | → | DESCENDING FIFTH | → | ASCENDING FOURTH |
| 1 | I | C | → | F | → | A# Bb | → | D# Eb |
| 2 | | C# Db | → | F# Gb | → | B | → | E |
| 3 | II | D | → | G | → | C | → | F |
| 4 | | D# Eb | → | G# Ab | → | C# Db | → | F# Gb |
| 5 | II | E | → | A | → | D | → | G |
| 6 | IV | F | → | A# Bb | → | D# Eb | → | G# Ab |
| 7 | | F# Gb | → | B | → | E | → | A |
| 8 | V | G | → | C | → | F | → | A# Bb |
| 9 | | G# Ab | → | C# Db | → | F# Gb | → | B |
| 10 | VI | A | → | D | → | G | → | C |
| 11 | | A# Bb | → | D# Eb | → | G# Ab | → | C# Db |
| 12 | VII | B | → | E | → | A | → | D |

<Definition of Areas for Phase Delay>

<Definition of direction and order of Phase Delay>

FIG. 12

Table of wavelength and period of note (equal temperament)

| Note No. | Note | Equal temperament | Wavelength | ms (millisecond) | | | | | |
|---|---|---|---|---|---|---|---|---|---|
| | | Hz | m | ① | ② | ③ | ④ | ⑤ | ⑥ |
| 45 | A | 110 | 3.091 | 9.09 | 18.18 | 27.27 | 36.36 | 45.45 | 54.55 |
| 46 | A#/B♭ | 116.54 | 2.917 | 8.58 | 17.16 | 25.74 | 34.32 | 42.90 | 51.48 |
| 47 | B | 123.47 | 2.754 | 8.10 | 16.20 | 24.30 | 32.40 | 40.50 | 48.59 |
| 48 | C | 130.81 | 2.599 | 7.64 | 15.29 | 22.93 | 30.58 | 38.22 | 45.87 |
| 49 | C#/D♭ | 138.59 | 2.453 | 7.22 | 14.43 | 21.65 | 28.86 | 36.08 | 43.29 |
| 50 | D | 146.83 | 2.316 | 6.81 | 13.62 | 20.43 | 27.24 | 34.05 | 40.86 |
| 51 | D#/E♭ | 155.56 | 2.186 | 6.43 | 12.86 | 19.29 | 25.71 | 32.14 | 38.57 |
| 52 | E | 164.81 | 2.063 | 6.07 | 12.14 | 18.20 | 24.27 | 30.34 | 36.41 |
| 53 | F | 174.61 | 1.947 | 5.73 | 11.45 | 17.18 | 22.91 | 28.64 | 34.36 |
| 54 | F#/G♭ | 185 | 1.838 | 5.41 | 10.81 | 16.22 | 21.62 | 27.03 | 32.43 |
| 55 | G | 196 | 1.735 | 5.10 | 10.20 | 15.31 | 20.41 | 25.51 | 30.61 |
| 56 | G#/A♭ | 207.65 | 1.637 | 4.82 | 9.63 | 14.45 | 19.26 | 24.08 | 28.89 |
| 57 | A | 220 | 1.545 | 4.55 | 9.09 | 13.64 | 18.18 | 22.73 | 27.27 |
| 58 | A#/B♭ | 233.08 | 1.459 | 4.29 | 8.58 | 12.87 | 17.16 | 21.45 | 25.74 |
| 59 | B | 246.94 | 1.377 | 4.05 | 8.10 | 12.15 | 16.20 | 20.25 | 24.30 |
| 60 | C | 261.63 | 1.300 | 3.82 | 7.64 | 11.47 | 15.29 | 19.11 | 22.93 |
| 61 | C#/D♭ | 277.18 | 1.227 | 3.61 | 7.22 | 10.82 | 14.43 | 18.04 | 21.65 |
| 62 | D | 293.66 | 1.158 | 3.41 | 6.81 | 10.22 | 13.62 | 17.03 | 20.43 |
| 63 | D#/E♭ | 311.13 | 1.093 | 3.21 | 6.43 | 9.64 | 12.86 | 16.07 | 19.28 |
| 64 | E | 329.63 | 1.031 | 3.03 | 6.07 | 9.10 | 12.13 | 15.17 | 18.20 |
| 65 | F | 349.23 | 0.974 | 2.86 | 5.73 | 8.59 | 11.45 | 14.32 | 17.18 |

FIG. 13

<Difference in scale value between equal temperament and just intonation>

| | | | Equal temperament | | | Just intonation | | | |
|---|---|---|---|---|---|---|---|---|---|
| | Note | Degree | Value in 12 equal temperament | Numerical value | Cent value | Just interval | Numerical value | Cent value | Difference (cent) |
| 1 | C | First degree | $2^{0/12} = 1$ | 1.000 000 | 0 | 1/1 | 1.000 000 | 0 | 0 |
| 2 | | Minor second | $2^{1/12} = \sqrt[12]{2}$ | 1.059 463 | 100 | 16/15 | 1.066 666 | 111.73 | −11.73 |
| 3 | D | Major second | $2^{2/12} = \sqrt[6]{2}$ | 1.122 462 | 200 | 9/8 | 1.125 000 | 203.91 | −3.91 |
| 4 | | Minor third | $2^{3/12} = \sqrt[4]{2}$ | 1.189 207 | 300 | 6/5 | 1.200 000 | 315.64 | −15.64 |
| 5 | E | Major third | $2^{4/12} = \sqrt[3]{2}$ | 1.259 921 | 400 | 5/4 | 1.250 000 | 386.31 | 13.69 |
| 6 | F | Perfect fourth | $2^{5/12} = \sqrt[12]{32}$ | 1.334 840 | 500 | 4/3 | 1.333 333 | 498.04 | 1.96 |
| 7 | | Tritone | $2^{6/12} = \sqrt{2}$ | 1.414 214 | 600 | 45/32 | 1.406 250 | 590.22 | 9.78 |
| 8 | G | Perfect fifth | $2^{7/12} = \sqrt[12]{128}$ | 1.498 307 | 700 | 3/2 | 1.500 000 | 701.96 | −1.96 |
| 9 | | Minor sixth | $2^{8/12} = \sqrt[3]{4}$ | 1.587 401 | 800 | 8/5 | 1.600 000 | 813.69 | −13.69 |
| 10 | A | Major sixth | $2^{9/12} = \sqrt[4]{8}$ | 1.681 793 | 900 | 5/3 | 1.666 666 | 884.36 | 15.64 |
| 11 | | Minor seventh | $2^{10/12} = \sqrt[6]{32}$ | 1.781 797 | 1000 | 16/9 | 1.777 777 | 996.09 | 3.91 |
| 12 | B | Major seventh | $2^{11/12} = \sqrt[12]{2048}$ | 1.887 749 | 1100 | 15/8 | 1.875 000 | 1088.27 | 11.73 |
| 13 | C | Eighth degree | $2^{12/12} = 2$ | 2.000 000 | 1200 | 2/1 | 2.000 000 | 1200 | 0 |

| Upper Side | | | | | | | | |
|---|---|---|---|---|---|---|---|---|
| | | 1 | | 2 | | 3 | | 4 |
| | | Fundamental tone | → | Ascending fourth | → | Descending fifth | → | Ascending fourth |
| 1 | I | C | | F | | A# Bb | | D# Eb |
| 2 | | C# Db | | F# Gb | | B | | E |
| 3 | II | D | | G | | C | | F |
| 4 | | D# Eb | | G# Ab | | C# Db | | F# Gb |
| 5 | III | E | | A | | D | | G |
| 6 | IV | F | | A# Bb | | D# Eb | | G# Ab |
| 7 | | F# Gb | | B | | E | | A |
| 8 | V | G | | C | | F | | A# Bb |
| 9 | | G# Ab | | C# Db | | F# Gb | | B |
| 10 | VI | A | | D | | G | | C |
| 11 | | A# Bb | | D# Eb | | G# Ab | | C# Db |
| 12 | VII | B | | E | | A | | D |

I "D" ··· (1) 1 wavelength = 6.81 ms/(2) 2 wavelengths = 13.62 ms
↓ Ascending fourth
II "G" ··· (3) 1 wavelength = 5.10 ms/(4) 2 wavelengths = 10.20 ms
↓ Descending fifth
III "C" (Music key) ···(5) 1 wavelength = 7.64 ms/(6) 2 wavelengths = 15.29 ms
↓ Ascending fourth
IV "F" ··· (7) 1 wavelength = 5.73 ms/(8) 2 wavelengths = 11.45 ms Fourth above and fifth below G is "C"

Areas I to IV fall within range of fifth degree

FIG. 18

| Phase Delay input table for areas | | | | | | | | | | | | | | | | |
|---|---|---|---|---|---|---|---|---|---|---|---|---|---|---|---|---|
| | | Upper Side | | | | | | | | Lower Side | | | | | | |
| | Area | I | | II | | III | | IV | | V | | VI | | VII | | VIII |
| | | Fundamental tone | → | Ascending fourth | → | Descending fifth | → | Ascending fourth | | Ascending fourth | ← | Descending fifth | ← | Ascending fourth | ← | Major second above fundamental tone |
| 1 | I | C | | F | | A# Bb | | D# Eb | | F | | C | | G | | D |
| 2 | | C# Db | | F# Gb | | B | | E | | F# Gb | | C# Db | | G# Ab | | D# Eb |
| 3 | II | D | | G | | C | | F | | G | | D | | A | | E |
| 4 | | D# Eb | | G# Ab | | C# Db | | F# Gb | | G# Ab | | D# Eb | | A# Bb | | F |
| 5 | III | E | | A | | D | | G | | A | | E | | B | | F# Gb |
| 6 | IV | F | | A# Bb | | D# Eb | | G# Ab | | A# Bb | | F | | C | | G |
| 7 | | F# Gb | | B | | E | | A | | B | | F# Gb | | C# Db | | G# Ab |
| 8 | V | G | | C | | F | | A# Bb | | C | | G | | D | | A |
| 9 | | G# Ab | | C# Db | | F# Gb | | B | | C# Db | | G# Ab | | D# Eb | | A# Bb |
| 10 | VI | A | | D | | G | | C | | D | | A | | E | | B |
| 11 | | A# Bb | | D# Eb | | G# Ab | | C# Db | | D# Eb | | A# Bb | | F | | C |
| 12 | VII | B | | E | | A | | D | | E | | B | | F# Gb | | C# Db |

FIG. 19

VIII "E" ··· (15) 1 wavelength = 6.07 ms/(16) 2 wavelengths = 12.14 ms
↓ Ascending fourth
VII "A" ··· (13) 1 wavelength = 4.55 ms/(14) 2 wavelengths = 9.09 ms
↓ Descending fifth
VI "D" ··· (11) 1 wavelength = 6.81 ms/(12) 2 wavelengths = 13.62 ms
↓ Ascending fourth
V "G" ··· (9) 1 wavelength = 5.10 ms/(10) 2 wavelengths = 10.20 ms

FIG. 20

Area I : In unison with x, same wavelength as x

Area II : perfect fourth above x, 3/4 of wavelength of x

Area III : perfect fifth below area II (major second below x), 9/8 of wavelength of x Area IV : perfect fourth above area III, 5/6 of wavelength of x

FIG. 21

Area V : In unison with area II, 3/4 of wavelength of x

Area VI : In unison with area I, same wavelength as x

Area VII : Perfect fourth above area VIII, 2/3 of wavelength of x

Area VIII : Major second above area I, 8/9 of wavelength of x

FIG. 22

| *Lower Side* | | | | | | |
|---|---|---|---|---|---|---|
| V | | VI | | VII | | VIII |
| Ascending fourth | ← | Descending fifth | ← | Ascending fourth | ← | Major second above fundamental tone |

FIG. 23

Table of wavelength and period of note (equal temperament)

| Note No. | Note | Equal temperament | Wavelength | Sample (sampling wavelength 48 KHz) | | | | | |
|---|---|---|---|---|---|---|---|---|---|
| | | Hz | m | ① | ② | ③ | ④ | ⑤ | ⑥ |
| 45 | A | 110 | 3.091 | 436 | 873 | 1309 | 1745 | 2182 | 2618 |
| 46 | A#/B♭ | 116.54 | 2.917 | 412 | 824 | 1236 | 1648 | 2059 | 2471 |
| 47 | B | 123.47 | 2.754 | 389 | 778 | 1166 | 1555 | 1944 | 2333 |
| 48 | C | 130.81 | 2.599 | 367 | 734 | 1101 | 1468 | 1835 | 2202 |
| 49 | C#/D♭ | 138.59 | 2.453 | 346 | 693 | 1039 | 1385 | 1732 | 2078 |
| 50 | D | 146.83 | 2.316 | 327 | 654 | 981 | 1308 | 1635 | 1961 |
| 51 | D#/E♭ | 155.56 | 2.186 | 309 | 617 | 926 | 1234 | 1543 | 1851 |
| 52 | E | 164.81 | 2.063 | 291 | 582 | 874 | 1165 | 1456 | 1747 |
| 53 | F | 174.61 | 1.947 | 275 | 550 | 825 | 1100 | 1374 | 1649 |
| 54 | F#/G♭ | 185 | 1.838 | 259 | 519 | 778 | 1038 | 1297 | 1557 |
| 55 | G | 196 | 1.735 | 245 | 490 | 735 | 980 | 1225 | 1469 |
| 56 | G#/A♭ | 207.65 | 1.637 | 231 | 462 | 693 | 925 | 1156 | 1387 |
| 57 | A | 220 | 1.545 | 218 | 436 | 655 | 873 | 1091 | 1309 |
| 58 | A#/B♭ | 233.08 | 1.459 | 206 | 412 | 618 | 824 | 1030 | 1236 |
| 59 | B | 246.94 | 1.377 | 194 | 389 | 583 | 778 | 972 | 1166 |
| 60 | C | 261.63 | 1.300 | 183 | 367 | 550 | 734 | 917 | 1101 |
| 61 | C#/D♭ | 277.18 | 1.227 | 173 | 346 | 520 | 693 | 866 | 1039 |
| 62 | D | 293.66 | 1.158 | 163 | 327 | 490 | 654 | 817 | 981 |
| 63 | D#/E♭ | 311.13 | 1.093 | 154 | 309 | 463 | 617 | 771 | 926 |
| 64 | E | 329.63 | 1.031 | 146 | 291 | 437 | 582 | 728 | 874 |
| 65 | F | 349.23 | 0.974 | 137 | 275 | 412 | 550 | 687 | 825 |

FIG. 24

| | |
|---|---|
| #1 | Delay waveforms in areas I/II relative to sound source x _major third |
| #2 | Delay waveforms in area I |
| #3 | Delay starting point is at unison relative to x (same waveform) |
| #4 | 1 wavelength of x |
| #5 | 4/5 of wavelength of x |
| #6 | Waveform of x |
| #7 | Negative phase waveform with delay of 1 wavelength (4/5 of wavelength of x) |
| #8 | Positive phase waveform with delay of 2 wavelengths (4/5 of wavelength of x) |
| #9 | Delay waveforms in area II |
| #10 | Delay starting point is major third above x (4/5 wavelengths) |
| #11 | Waveform of 4/5 wavelength |
| #12 | Positive phase waveform with delay of 4/5 wavelengths (4/5 of wavelength of x) |
| #13 | Negative phase waveform with delay of 8/5 wavelengths (4/5 of wavelength of x) |

METHOD FOR GENERATING STEREOPHONIC SOUND

FIELD OF THE INVENTION

The present invention relates to a method for generating a stereophonic sound by performing phase delay control. The present invention particularly relates to a method for generating a stereophonic sound by performing phase delay control in such a way as to cause a listener to feel as if a sound source is present on the rear side in binaural technology.

BACKGROUND OF THE INVENTION

In reproducing a 3D space by binaural technology, it is difficult to reproduce the 3D space as if a sound source is present on the "rear" side or to reproduce a sound "on the upper side or the lower side". It is difficult to distinguish sound sources on the front, rear, up, and down sides only with a currently commercially available 3D panner or binaural decoder.

The main reason considered is the idea of a head-related transfer function (HRTF). The HRTF describes, as a transfer function, a change in sound caused by surrounding objects including auricles, a human head, and shoulders. The HRTF changes acoustic feeling of a three-dimensional space according to difference in shape of the ears or the head of each listener listening to music and hence, the only method that can be used is that an HRTF for each listener is measured and each listener uses a dedicated HRTF. As one example of a conventional technique, PATENT LITERATURE 1 discloses an audio signal processing method that performs binaural rendering by making use of HRTF.

Currently, to individually provide a dedicated HRTF, a system is being put into practice, in which a listener takes a picture of own ears, and an HRTF that fits to an individual listener is reconstructed by AI (artificial intelligence techniques) from huge profile that is prepared in advance. However, such a system is not a perfect HRTF and hence, some questions remain in reproducibility. Further, such a system is a solution focusing on a physical aspect and hence, a psychological subjective evaluation, such as "fatigue" or "experience", is not calculated. Accordingly, accuracy of the system is unknown.

Most HRTFs mounted on binaural decoders are made by using "KU-100", which is a "dummy head" and is made by SENNHEISER (see NON PATENT LITERATURE 1), as a model. Although the KU-100 is excellent for general purposes, the KU-100 fails to allow every person to efficiently feel a 3D space, thus is not a universal device.

As disclosed in NON PATENT LITERATURE 2 or the like, it is known that people perceives localization of the sound source perceived by people by controlling an interaural time difference or intensity by performing phase delay control, in which a negative phase or a delay, for example, is controlled. However, a technique has not been studied in which a phase shift is applied to an original sound by using a sound delaying device to cause a listener to perceive localization of the sound source.

In NON PATENT LITERATURE 3, it is pointed out that the degree of dissonance relates to not only frequency and sound pressure but also phase. However, NON PATENT LITERATURE 3 does not reach a specific conclusion, and fails to propose the idea of using the degree of dissonance for reproducing a 3D space.

CITATION LIST

PATENT LITERATURE 1: JP-A-2018-502535

NON PATENT LITERATURE 1: http://neumannjapan.com/neumann.user.ItemDetail/id/29.html NON PATENT LITERATURE 2: https://jinzaiipedia.ipa.go.jp/mitou_ipedia/development_result/post/音響制御プログラムの開発

NON PATENT LITERATURE 3: Yukiko Yamamoto et al, A Research Review on Perception of Consonance and Dissonance: As a Focus on Sensory Consonance, Cognitive Studies, Vol. 22 (2015) No. 2 (particularly see 3.2 phase and time domain model)

SUMMARY OF INVENTION

Technical Problem

According to one aspect of the present invention, one of objects of the present invention is to provide a method for generating a pseudo-stereophonic sound by binaural reproduction.

Solution to Problem

The present invention solves the above-described problem by a "mixing technique", and more specifically, solves the above-described problem by a method for simulating acoustic feeling by a "phase control technique".

One aspect of the present invention provides a method for generating a stereophonic sound by mixing sounds having controlled phases.

Specifically, one aspect of the present invention is directed to a technique in which a focus is placed on a sense of localization on the rear side that is difficult to create, a plurality of delay devices (delay machines) are used, and a phase angle with respect to an original sound is controlled by changing time, phase, and direction in the delay devices, so that a sound source localized on the rear side emphasizes or effectively simulates such an effect that the sound source "is actually present on the rear side", thus improving a subjective evaluation in the mental space.

More specifically, one aspect of the present invention provides a method for generating a stereophonic sound by performing phase delay control, the method including:

a step of obtaining an acoustic signal having a base note on a right ear side and an acoustic signal having a base note on a left ear side; and a step of determining to control a phase of either one of the acoustic signal obtained on the right ear side and having a note or the acoustic signal obtained on the left ear side and having a note, wherein the acoustic signal having the base note to be delayed is further subjected to a step of generating an acoustic signal that is derived from a frequency of the acoustic signal having the base note and that has a first phase shift generated by performing a first phase delay process on the acoustic signal having the base note, a step of generating an acoustic signal that is derived from the acoustic signal having the base note and that has a second phase shift generated by performing a second phase delay process on the acoustic signal having the base note, a step of generating an acoustic signal that is derived from a frequency of an acoustic signal having a note different from the base note and that has a third phase shift generated by performing a third phase delay process on the acoustic signal having the base note, a step of generating an acoustic signal that is derived from the frequency of the acoustic signal having the note different from the base note and that has a fourth phase shift generated by performing a fourth phase delay process on the acoustic signal having the base note, and a step of synthesizing the acoustic signal obtained and having the base note, the acoustic signal having the first phase shift, the acoustic signal having the second phase shift, the acoustic signal having the third phase shift, and the acoustic signal having the fourth phase shift.

Advantageous Effect of Invention

According to one aspect of the present invention, it is possible to reproduce a pseudo-stereophonic sound by using audio equipment, such as headphones.

Other objects, features, and advantages of the present invention will become apparent from the following description of embodiments of the present invention related to attached drawings.

BRIEF DESCRIPTION OF DRAWINGS

FIG. 12 shows a Table of wavelength and period of note (equal temperament);

FIG. 13 shows a Comparison table between equal temperament and just intonation;

FIG. 18 shows Phase Delay input table for areas;

FIG. 19 shows notes VIII to V;

FIG. 20 shows Area I to Area IV;

FIG. 21 shows Area V to Area VIII;

FIG. 22 shows Lower Side;

FIG. 23 shows a Table of wavelength and period of note (equal temperament); and FIG. 24 shows a table of waveforms.

DETAILED DESCRIPTION OF THE INVENTION

Figure 1:
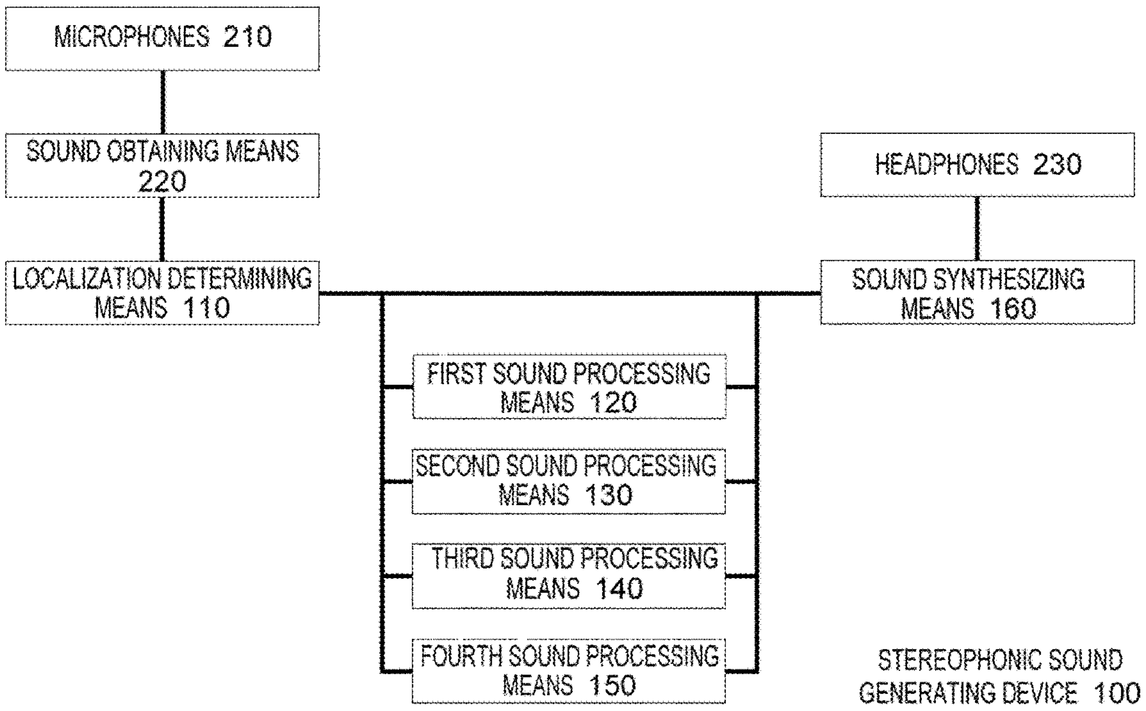
FIG. 1 shows one example of a stereophonic sound generating device according to one embodiment of the present invention.

General acoustic theory will be described. First, the relationship between speed of sound, frequency, and wavelength will be described.

For example, under conditions of 1 atmosphere, temperature: 15 degrees Celsius, and medium: air (no wind), the speed of sound is approximately 340 m/s (340 m per second), and the speed of sound decreases as temperature decreases.

$$\text{Next, speed of sound (distance}(m))=\text{frequency}(Hz)\times\text{wavelength}(m) \qquad \text{(equation 1).}$$

For example, when the wavelength of a note D (the tone of "re") for note number 50 is inserted in the equation 1. 340 m/s/147 Hz=2.31 m is obtained, so that 1 wavelength of D is 2.31 m.

Further, it can be understood that time required for D to pass 1 wavelength (2.31 m) is 2.31 m/340 m/s=approximately 6.8 ms (milliseconds).

Phase Control Effect in Sound Environment Evaluation System

A perceptual mechanism relating to spatial characteristics of sound can be roughly classified into a "physical aspect" and a "mental aspect".

There is a conventionally proposed evaluation system that receives, as an input, an acoustic signal emitted from a "sound source" in a space, and that outputs a comprehensive subjective evaluation by a listener with respect to the sound field created by the acoustic signal (see Acoustic Science Series 2 "Spatial Acoustics", edited by Acoustical Society of Japan).

In a physical space, acoustic signals emitted from a sound source reach the position of a listener (listening point) while being affected by a spatial transfer function that represents the influence of reflection, scattering, diffraction and the like caused by a wall or a ceiling. Further, the acoustic signals reach the entrance of the left and right ear canals of the listener while being affected by a head-related transfer function (HRTF) that represents the influence of the head. These phenomena occur in the physical space, so mainly individual differences in physical characteristics, such as the shape of the ear or the size of the head, become a big issue. The following phenomena starting from entering the auditory organ occurs in a mental space. In the mental space, a subjective evaluation is made on sense elements, such as how the person feels a space, based on personal preference, and the subjective evaluation of each sense element is further weighted also based on personal preference. The results are ultimately integrated, and then a comprehensive subjective evaluation is given.

In the mental space, the listener perceives a sound image having various sense elements that can be roughly classified into the following three natures.

1. Temporal nature—reverberation feeling/sense of rhythm/persistence or the like
2. Spatial nature—direction feeling/distance feeling/spread feeling or the like
3. Qualitative nature—volume/pitch/sound quality or the like What is important here is that there are "two kinds of individual differences" in the mental space of this evaluation system. One is an individual difference in perceiving a sense element, and the other is an individual difference at the time of making a subjective evaluation. This means that even when people listen to exactly the same sound, how the person feels or likes and dislikes varies depending on the person.

Sound Environment Evaluation System+Phase Delay Control

Phase delay control of this embodiment is created in order to strongly affect "direction feeling" and "spread feeling", being the spatial natures defined as sense elements in the mental space. By performing calculated phase control on an original sound to reduce an individual difference in perception with respect to "direction feeling (sense of localization)", "front and rear feeling", and "up and down feeling", being sense elements, the comprehensive subjective evaluation can be successfully raised.

Embodiment 1

One embodiment of the present invention will be described with reference to drawings.

"Phase control technique" in this embodiment is a technique in which a plurality of delay processes are performed by focusing on a sense of localization on the rear side that is difficult to create, and such an effect that "the sound source is actually present on the rear side" is emphasized or effectively simulated by controlling a phase angle with respect to an original sound by changing delay time, phase, and direction in the delay process, so that it is possible to improve a subjective evaluation in the mental space.

FIG. 1 is a conceptual diagram of phase control in this embodiment. In this embodiment, FIG. 1 shows an image in which delay time is set by using note C=131 Hz as a reference.

FIG. 1 shows one example of a stereophonic sound generating device according to one embodiment of the present invention.

A stereophonic sound generating device 100 in this embodiment includes sound obtaining means 220, localization determining means 110, first sound processing means 120, second sound processing means 130, third sound processing means 140, fourth sound processing means 150, and sound synthesizing means 160.

The sound obtaining means 220 obtains acoustic signals from microphones 210. The localization determining means 110 obtains the acoustic signals from the sound obtaining means 220.

The first sound processing means 120 performs a process (phase delay control, for example) on the acoustic signal obtained from the localization determining means 110 to generate a first acoustic signal (having a first phase shift, for example).

The second sound processing means 130 performs a process (phase delay control, for example) on the acoustic signal obtained from the localization determining means 110 to generate a second acoustic signal (having a second phase shift, for example).

The third sound processing means 140 performs a process (phase delay control, for example) on the acoustic signal obtained from the localization determining means 110 to generate a third acoustic signal (having a third phase shift, for example).

The fourth sound processing means 150 performs a process (phase delay control, for example) on the acoustic signal obtained from the localization determining means 110 to generate a fourth acoustic signal (having a fourth phase shift, for example).

The sound synthesizing means 160 synthesizes sounds and outputs an acoustic signal to headphones 230. The headphones 230 may be a device that can directly output sounds to both ears, such as earphones or headphones.

Figure 2:
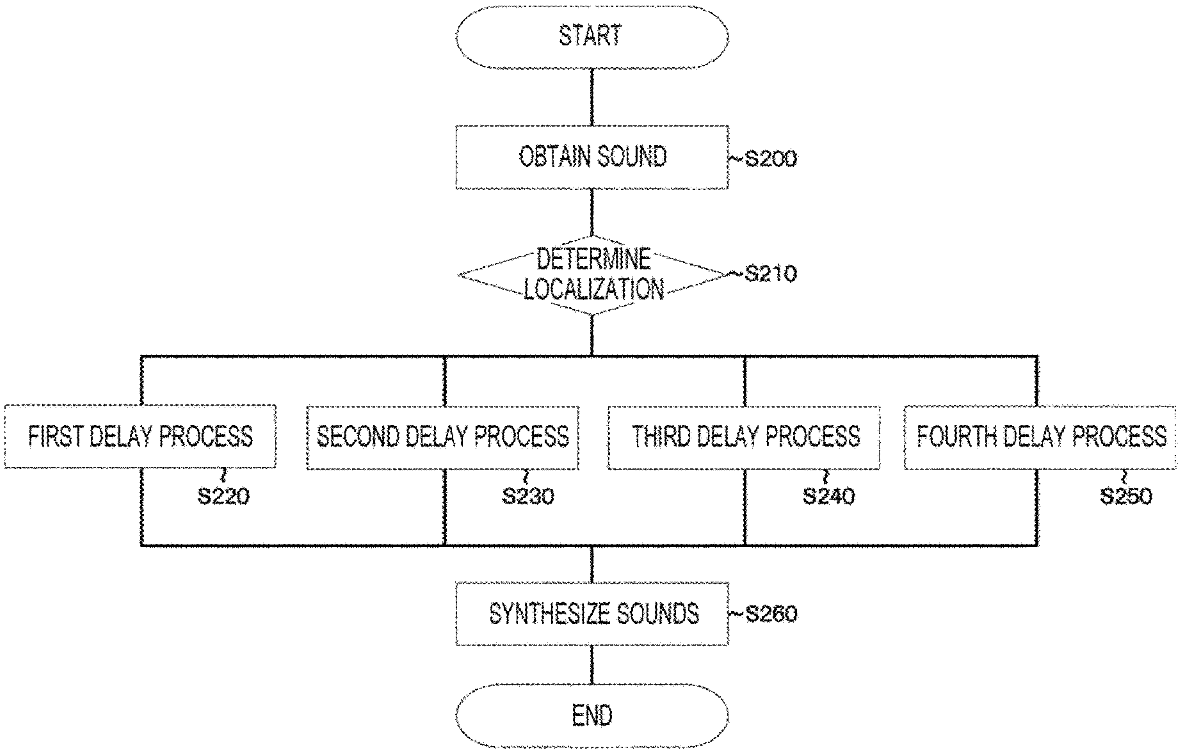
FIG. 2 is a flowchart of a method of phase control according to one embodiment of the present invention.

FIG. 2 is a flowchart of a method of phase control according to one embodiment of the present invention. In this embodiment, the description will be made by using a single note (C: the tone of "do") to simplify the description.

A sound of the original sound is obtained in S200. In this embodiment, the following information process will be described assuming that a note (single note) C≈131 Hz) is obtained.

In the determination of localization in S210, it is assumed that the sound is localized at the horizontal plane of 0 degrees and the sound of the note is output on the left ear side (L) and the right ear side (R) at the equivalent level, and a phase difference between both ears is zero.

In S220, a first delay process is performed on the sound received from S210 to generate a first phase shift. In this process, the length of delay is the delay time corresponding to 1 wavelength of the obtained sound. In this embodiment, the delay time corresponding to 1 wavelength of C is approximately 7.6 ms. A negative phase process of 180 degrees is performed on the first phase shift, and the first phase shift is synthesized with the sound of the note, thus generating a phase difference of 180 degrees.

As shown in S230, a second delay process is performed on the sound received from S210 to generate a second phase shift. In this process, the length of delay is the delay time corresponding to 2 wavelengths of the obtained sound. In this embodiment, the delay time corresponding to 2 wavelengths of C is approximately 15.3 ms. A phase difference generated by synthesizing the second phase shift with the sound of the note is 0 degrees.

Figure 3:
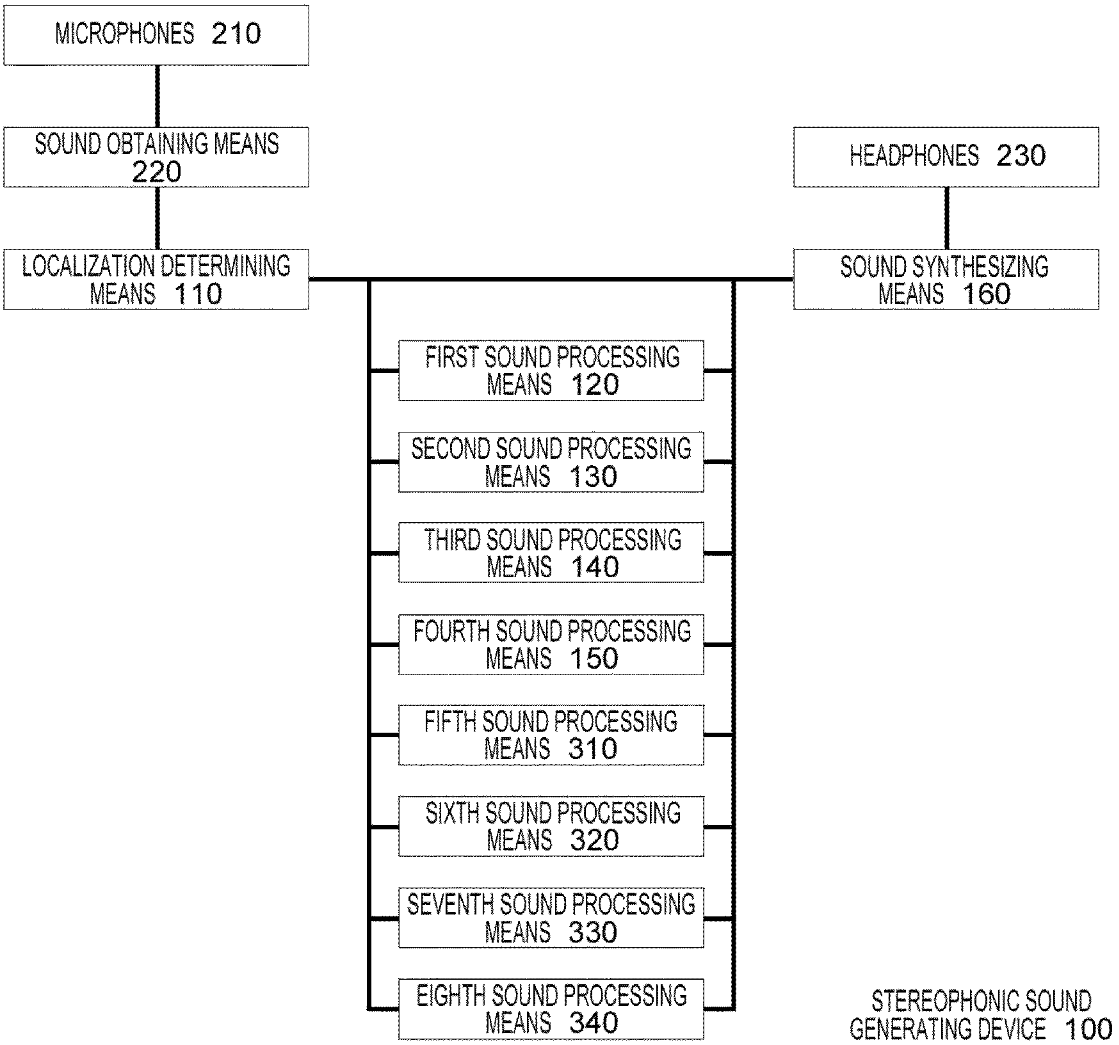
FIG. 3 shows one example of a stereophonic sound generating device according to another embodiment of the present invention.
Figure 4:
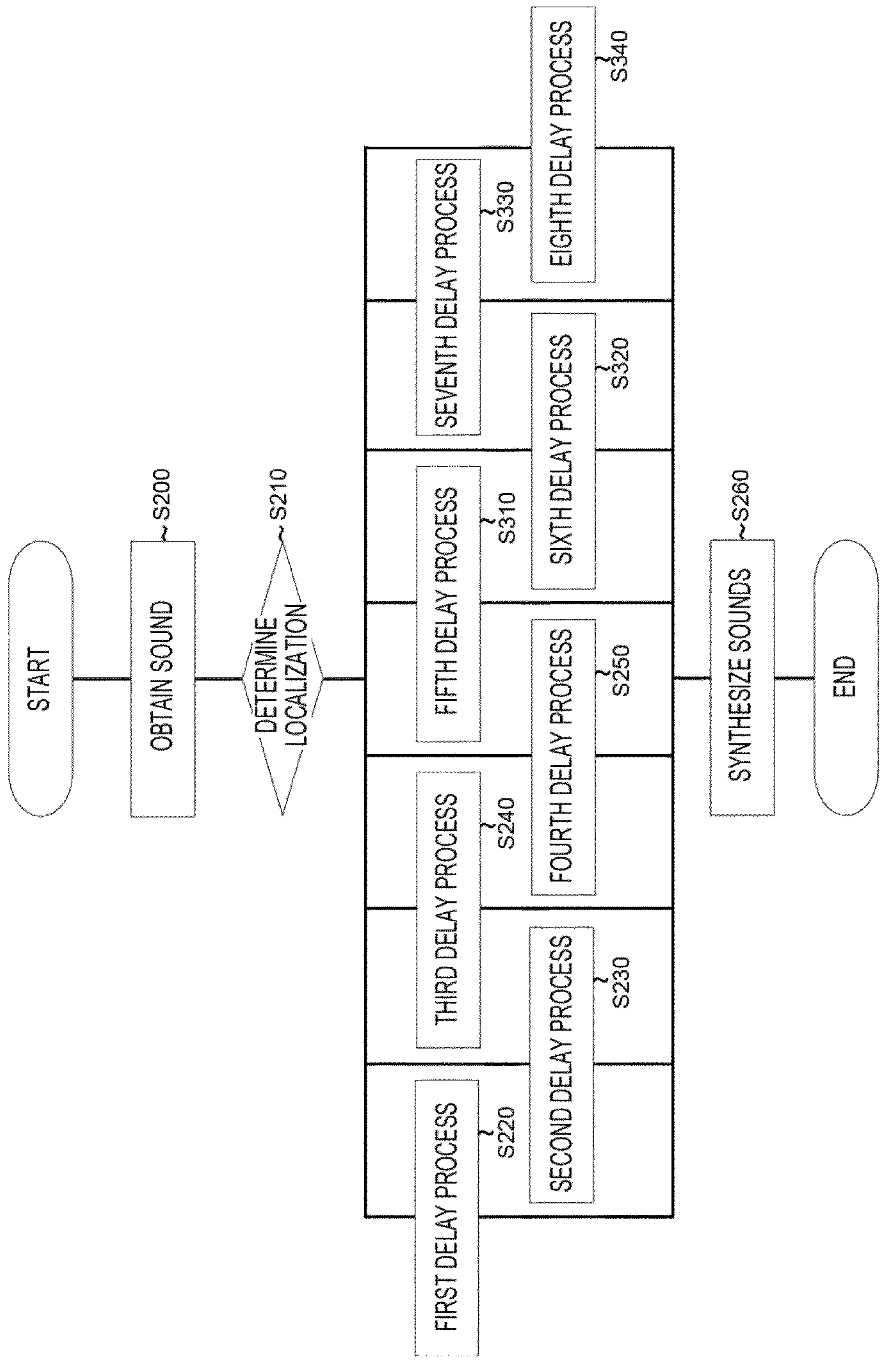
FIG. 4 is a flowchart of a method of phase delay control according to another embodiment of the present invention.

As shown in S240, a third phase shift is generated by performing a third delay process in which a wavelength corresponding to a note F≈175 Hz that is a perfect fourth above the obtained note generates a phase shift, and the note of the perfect fourth has a phase difference of −90 degrees with respect to the sound of the original sound. In this embodiment, the obtained note that is a perfect fourth of C is F (the tone of "fa"). From the equation 1, it can be calculated that the wavelength of F is approximately 1.95 m. The length of delay in the third delay process is the time corresponding to the wavelength of the obtained F (3/4 of the wavelength of C) a perfect fourth of C, that is, approximately 5.7 ms. FIG. 3 and FIG. 4 show an embodiment obtained by developing FIG. 1 and FIG. 2. Hereinafter, in this embodiment, the description will be made for phase delay control based on eight directions shown in FIG. 3, FIG. 4 and the like. However, those skilled in the art can also achieve phase delay control based on four directions shown in FIG. 1, FIG. 2, and FIG. 5A.

The relationship between a unison and a perfect fourth in 12 equal temperament will be described.

A unison is 2ˆ0/12=1

A perfect fourth is 2ˆ5/12=1.33

The reason for combining a unison and a perfect fourth is that when panning is performed at the current point of time, it is possible to obtain a bilaterally symmetrical phase shift.

In S250, a fourth phase shift is generated by performing a fourth delay process in which a wavelength corresponding to a note that is a perfect fourth above the note has a phase difference of −90 degrees (270 degrees). The fourth phase shift is delayed from the third phase shift by 90 degrees. In this process, the length of delay is the delay time corresponding to 2 wavelengths of the obtained note that is a perfect fourth of C (1.5 wavelengths of the original sound C). In this embodiment, the length of delay is 11.5 ms.

In S260, the first phase shift, the second phase shift, the third phase shift, and the fourth phase shift generated in the processes in S220 to S250 are synthesized with the original sound.

The processes from S220 to S250 is not performed in the above-described order, but steps from S220 to S250 are performed simultaneously.

The present inventor has found that when the process shown in FIG. 2 is performed, "the phase angle at which a listener feels that sound is changed the most" relative to the original sound "is 90 degrees". Although sound sources having opposite phases on the left and the right cause the listener to "feel the greatest change", such sound sources do not create a comfortable sound. However, the inventor has found that an uncomfortable sound supports the sense of localization on the rear side.

The phase of delay of "7.6 ms" in the 180-degree rear direction, which is on the X axis, is inverted to be set to the opposite phase, and the phase of delay of "15.3 ms" in the 90-degree direction, which is on the Y axis, is set to a positive phase.

The reason why these phases are set to opposite phases is to compensate for the point at which phases cancel each other due to opposite phases, and to prevent volume from being amplified due to overlapping of the same phase.

On the other line, it is necessary to set a phase opposite in the X axis or the Y axis to the above-mentioned phase set for the note C at a phase inversion point of "F"≈175 Hz that is a perfect fourth relative to the note C (in equal temperament). The reason why a perfect fourth is selected is that the phases in the Y axis direction, which are the phase in the 90-degree direction and the phase in the −90-degree (270-degree) direction, take the same phase as the original sound. The above-mentioned bilaterally symmetrical phase pattern can thus be described.

Definition of Areas

Phase delay control (phase delay control) in this embodiment refers to a 3D space simulation device in which 360 degrees on a plane is equally divided into four areas, each of the four areas is caused to have two layers in the vertical direction, thus generating eight areas, and two delay machines are set in each of the eight areas at 90 degree intervals. By setting different delay times at such specific angles, it is possible to create a substantially symmetrical phase shift (at the time of a specific frequency) "between the left and the right" on the front side and the rear side.

Definition of Areas for Phase Delay Control

Figure 9:
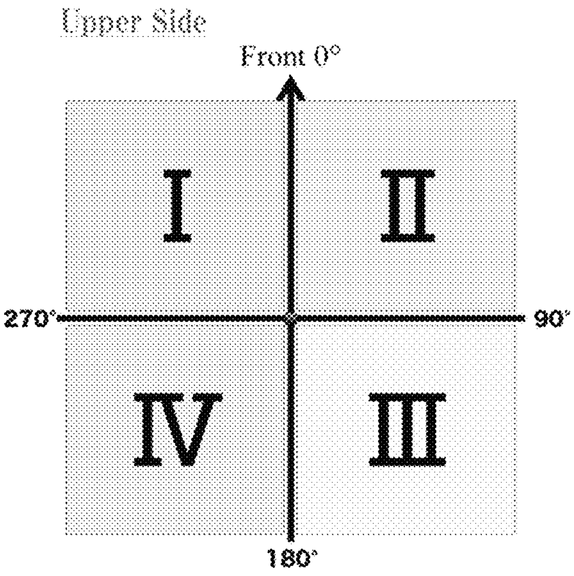
FIG. 9 shows the Definition of Areas of Phase Delay.

In "definition of areas for phase delay control" in FIG. 9, 360 degrees on the horizontal plane coordinates is divided into four areas at 90 degree intervals, and the upper side of the areas is assumed as an "Upper Side" and the lower side of the areas is assumed as a "Lower Side". Symbols are allocated to respective areas in a clockwise manner starting from the area on the front left side of the Upper Side, that is, areas I to IV. In the same manner, symbols are allocated to respective areas of the Lower Side, that is, areas V to VIII.

By setting elevation of a 3D panner to about +35 degrees (elevation angle) in the "Upper Side" and by setting elevation of a 3D panner to about −35 degrees (depression angle) in the "Lower Side", it is possible to obtain a moderate phase shift between the Upper Side and the Lower Side.

In this embodiment, the areas are set in a clockwise manner. However, as another embodiment, the areas may be set in a counterclockwise manner as the basic setting. In such a case, although the area starts from the front right area, the description becomes complicated and hence, all descriptions in this embodiment are unified to a description in which the areas are set in a clockwise manner.

Definition of Direction and Order

It is necessary to start up the two delay machines in each of these areas at an angular interval of 90 degrees.

Figure 10:
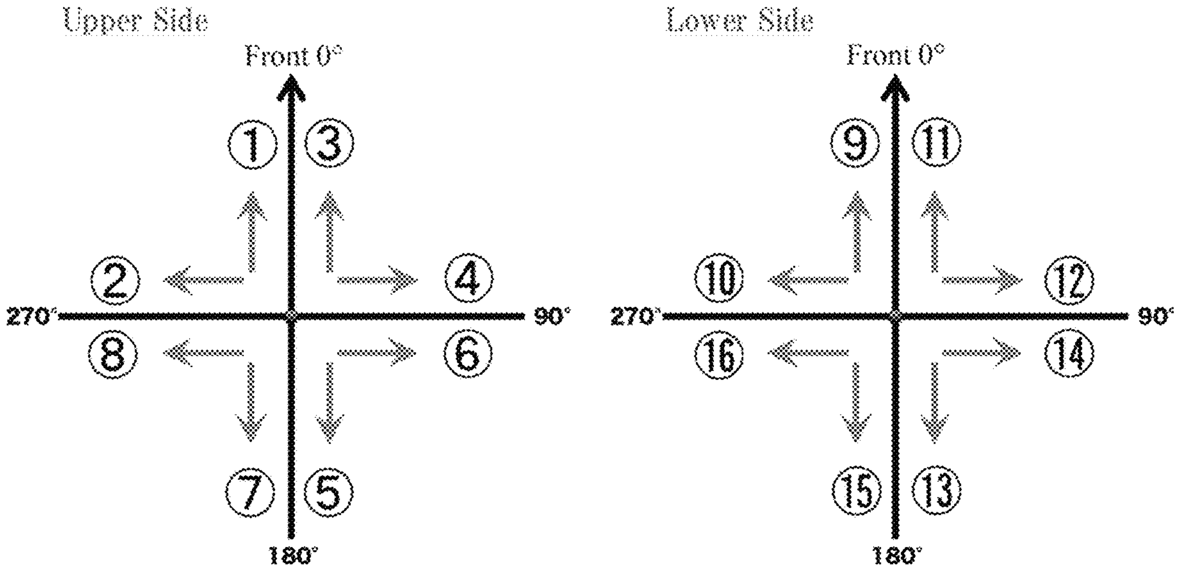
FIG. 10 shows the Definition of direction and order of Phase Delay.

The diagram of FIG. 10 defines the directions and the order in which the respective delay machines start up.

Definition of Direction and Order of Phase Delay

Sixteen delay machines are disposed in the order shown in FIG. 10 in the above-mentioned definition of areas, such that the former number (odd number) in each area is along the x axis (front and rear direction) and the latter number (even number) in each area is along the y axis (left and right direction). "Time setting" and "difference between positive phase and negative phase" of each of these sixteen delay machines create "impulse response", and this "impulse response" supports the creation of localization of a 3D space.

Phase and Ratio Between Each Area

Figure 11:
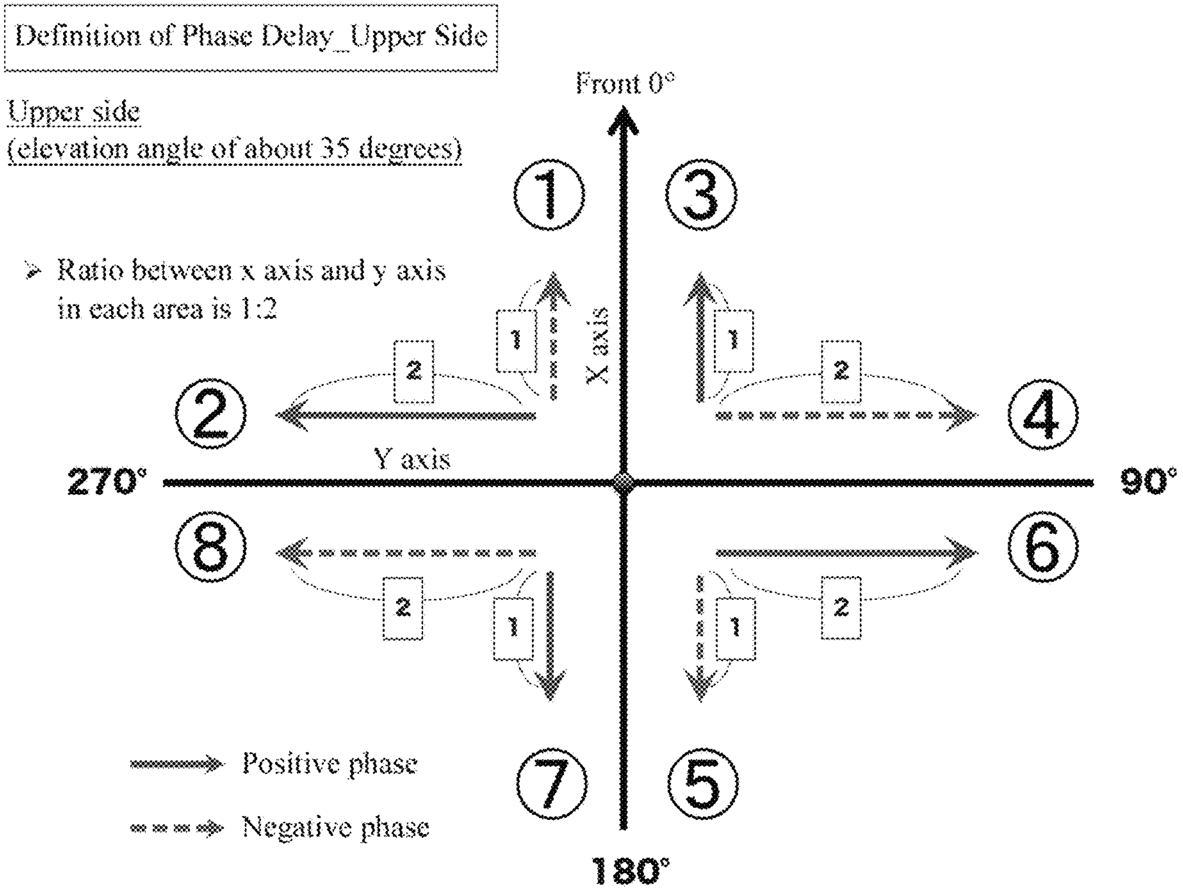
FIG. 11 shows the Definition of Phase Delay_Upper Side.

The diagram of FIG. 11 defines the phases of the delay machines and a ratio of time in each area.

For example, when the delay machine (1)(x axis) is set to have a "negative phase" and the delay machine (2)(y axis) is set to have a "positive phase", a delay time ratio between (1) and (2) is 1:2. In the drawing of FIG. 11, a "solid line" indicates a positive phase and a "dotted line" indicates a negative phase, and with 1 set for the x axes and 2 set for all y axes. These roles are absolute rules. By following the rules of "positive/negative" of phases and the ratio between each area, it is possible to obtain a symmetrical phase pattern of a sine wave with a specific frequency, leading to production of a 3D space having almost no difference between the left and right sides.

The term "negative phase" indicates a waveform in which the phase is shifted by 180 degrees from the positive phase, and "peaks" and "troughs" of the waveform of the "negative phase" are opposite to "peaks" and "troughs" of the waveform of the positive phase.

It is essential to set opposite phases for the phase of delay in the Upper Side and the phase of delay in the Lower Side. That is, it is essential to set opposite phases for phases of delay located along the same direction as viewed in the vertical direction.

Note and Wavelength

The basic operation of the phase delay control is to add delay time obtained with respect to "note=frequency" to an original sound. In this operation, a relationship between amplitude (wavelength) of sound and speed of sound is important.

The table of FIG. 12 shows, in milliseconds, 1 wavelength (m) of note (frequency/Hz) that is obtained based on the equal temperament, time required for passing 1 wavelength of the note in column (1), and time required for passing 2 wavelengths of the note in column (2).

Calculation for obtaining wavelengths in the table shown in FIG. 12 is performed by the following formula.

$$\text{wavelength}=\text{propagation speed in air}(340\,m/s)/\text{frequency}$$

(Propagation speed in air: approximately 340 m/s when the atmospheric pressure is 1 atmosphere and a temperature is 15 degrees Celsius). Frequency indicates the number of repeated oscillations made by a sound wave in 1 second. For example, the frequency of "Note No. 50 D" in equal temperament is approximately 146.83 Hz, and when 1 wavelength is calculated assuming that the speed of sound is 340 m/s, 340/146.83=2.316 m is obtained. Further, time required for passing 1 wavelength is 6.81 ms.

To generate a phase shift for emphasizing localization, it is necessary to set an extremely short delay time, and it is desirable to set a delay time to 20 ms or less at maximum. In the case in which a numerical value greater than 20 ms is adopted, although a serious problem does not arise in the sound source having a continuous sound, it becomes difficult to generate a phase shift in an attack sound source, having a short sound, or in a percussion sound source. Further, it is found by Plomp & Steeneken (1969) that a greater effect due to phase can be obtained with lower frequencies.

Due to these two conditions, the most effective range of note=frequency at which the phase delay is generated is 1 and a half octaves ranging from "Note No. 45 A=110 Hz" to "Note No. 64 E=330 Hz".

Scale Value of Equal Temperament and Just Intonation

The table of FIG. 13 shows difference in value generated between respective notes in "equal temperament" and "just intonation".

Although the detailed description will be omitted, as shown in the table of FIG. 13, there is a difference in interval between equal temperament and just intonation. In simple words, in the case of a chord in which two or more sounds overlap, just intonation generates a clearer sound. However, just interval has non-constant intervals and hence, a defect of giving unclear sound occurs when modulation is made or for certain chord combinations. The equal temperament is developed to compensate such a defect, and scales of current music are based on equal temperament.

Most music used for sound sources is created based on the equal temperament. However, when values in the equal temperament are used in the present technique, it is necessary to use extremely complicated numerical values. For this reason, in the description made hereinafter for a phase delay control technique, numerical values are used that can be represented by fractions and that are obtained based on the just interval.

Due to the nature of frequency being inversely proportional to waveform, just interval "4/3" of "perfect fourth above" shown in "6" in the table is "3/4" in wavelength. For example, while a note "C" at a unison has 1 wavelength, "F" that is a perfect fourth above "C" has 3/4 wavelengths.

Ratio of Phase Delay Between Areas

Figures 14, 15:
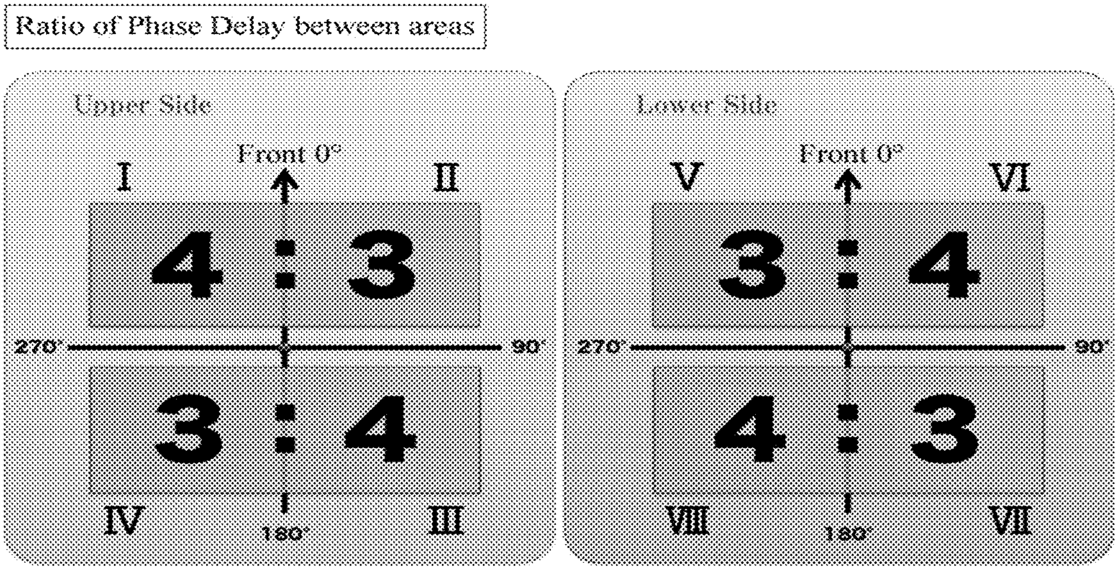
FIG. 14 shows a Ratio of Phase Delay between areas.
FIG. 15 shows a setting table for Upper Side.

The diagrams of FIG. 14 show a ratio of wavelengths to be input into the respective areas.

The ratio of wavelengths between the area I and the area II and between the area III and the area IV is 4:3. In contrast, the ratio of wavelengths between the area V and the area VI and between the area VII and the area VIII is 3:4.

The ratio of 4:3 is a "relationship of a perfect fourth" in terms of "interval", so that a note of the area II is a perfect fourth above a note of the area I.

The fact that the ratios in the Upper Side are opposite to the ratios in the Lower Side will be described in detail in a later section.

Delay Setting of Phase Delay

In making the phase delay control setting, it is important to find out the fundamental tone of a chord, being a "key in music". The music key indicates "reference tonality" for music, and current pop music is generally music with tonality. A first step for the basic setting is to input the fundamental tone to the area III. However, music varies widely and is made up of combinations of various chords and hence, the method in which a music key is input into the area III is not always the most appropriate method. Accordingly, it is necessary to try some patterns. In the description of the present technique, the description will be made for a method for inputting the fundamental tone of a music key into the area III, the method being capable of providing the most statistically preferable sense of localization.

The "Setting table for Upper Side" of FIG. 15 shows notes having delay values input into the respective areas. For example, when a music key is "C", the component chord is made up of "C (do)/E (mi)/G (so)", so that a row is referred to in which "C (do)" being the fundamental tone of the chord is present in the area III. The third row is the corresponding row and hence, delay values of "D/G/C/F" in that row are input into the delay machines in the respective areas of the Upper Side.

For delay values, numerical values for the delay of 1 wavelength and 2 wavelengths are input by referring to "Table of wavelength and period of note (equal temperament)" in the table FIG. 12.

In the phase delay control technique, "fundamental tone" is important and hence, it does not matter whether a component sound is "major" or "minor".

In other areas, values are input according to the following method calculated based on a unique theory.

The "setting table for Upper Side" of FIG. 15 defines connection between the areas I to IV. A shift from the area I to the area II is "ascending fourth", a shift from II to III is "descending fifth", and a shift from III to IV is "ascending fourth". This order is "the basis of the phase delay control technique", and provides an impulse response effective in causing a listener to feel a 360-degree space.

Figures 16, 17:
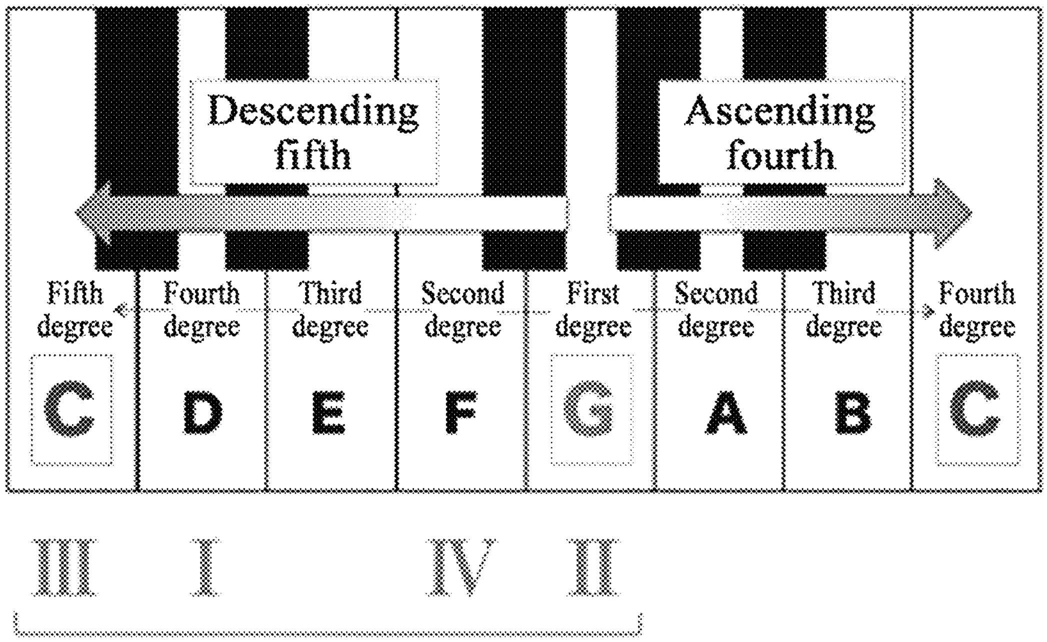
FIG. 16 shows notes from I to IV.
FIG. 17 shows Fourth above and fifth below G is "C"

Note symbols for notes forming the basis of the delay setting are shown in the table of FIG. 16. For example, when the area I is "C", "1 wavelength=7.64 ms" and "2 wavelengths=15.29 ms" are input into the predetermined delay machine based on the table of FIG. 12, that is, Table of wavelength and period of note (equal temperament).

Delay Setting for Upper Side

The details of the delay setting, which are simply described in the previous paragraphs, will be describe in order from the Upper Side.

Setting Example when Music Key is "C"

Find out a row in which "C" is written in the area III from "setting table for Upper Side" of FIG. 15. Such a row corresponds to the third row and hence, "D/G/C/F" are input targets. First, "D" is disposed in the area I. The note "G" that is a perfect fourth above "D" is disposed in the area II. The note "C" (music key) that is a fifth below "G" is disposed in the area III. Further, the note "F" that is a fourth above "C" is disposed in the area IV.

When the area shifts from II to III, G "descends a fifth to "C"". Actually, even when G ascends a fourth, G shifts to the same "C" (1 octave above). That is, both an ascending fourth and a descending fifth result in the same note 1 octave apart. (The frequency increases twice and the wavelength decreases by ½ for 1 octave above). For example, it is also possible to consider a pattern in which the note "C" in the area III is caused to ascend a fourth, thus providing ascending a fourth between each two adjacent areas. However, such a pattern ultimately causes the note of the area I to be extremely apart from the delay time in the area IV, leading to generation of a sense of incongruity in impulse response. In order to avoid such a case, measures are taken in which, when the area shifts from II to III, G descends a fifth, that is, a note descends to a note a major second (two semitones) below the fundamental tone, thus preventing waveforms from being apart from each other as a whole. Due to such operations, notes from I to IV fall within a perfect fifth as shown in FIG. 17, thus bringing about a state in which waveforms are densely present. As a result, it is possible to generate "a phase angle effective in simulating a space".

"Dialog" or "sound effect" having no tone does not have a "music key". In such a case, it is effective to set "G", "A", "B" or the like that causes a short wavelength as a whole. When a wavelength is short, a delay sound (impulse response) around the sound source also becomes short, thus producing a narrower space. Such an effect is extremely effective for dialog or the like, thus supporting creation of localization without causing a sense of incongruity. (The details will be described in a later paragraph.)

Delay Setting for Lower Side

In the same manner as the Upper Side, numerical values generated based on a unique theory are input also into the Lower Side.

The table of FIG. 18 is a complete version of an input table for areas, including the above-mentioned input for the areas of the Upper Side.

In making the delay setting for the Lower Side, it can be more easily understood when the setting is made "in the form of going back from the area VIII", which is opposite to the form used in the Upper Side.

The setting is as follows. First, a note that is a major second (two semitones) above the fundamental tone is set in the area VIII, which is the starting point. Then, when the area VIII shifts to the area VII, the note "ascends a fourth". When the area VII shifts to the area VI, the note "descends a fifth". When the area VI shifts to the area V, the note "ascends a fourth".

What should be focused on here is a point that the setting of the areas I, II is opposite to the setting of the areas V, VI. In the example of the first row in the table of FIG. 18, it can be understood that while "C, F" are set in the areas I, II, "F, C" are set in the areas V, VI, that is, the left is opposite to the right. These settings are settings of "the upper front side and the lower front side". By adopting 4:3 for the Upper Side and 3:4 for the Lower Side, it is possible to align phases. However, such settings cause the phases to be excessively aligned, thus bringing about a state in which the center is close to monaural. Countermeasures will be described in a later paragraph.

Basically, a sense of localization on the front side is stabilized by inputting such numerical values into the Lower Side, thus differentiating the front side from the rear side.

The setting in the case of the "C" key is shown in the example of the Upper Side, and the setting for the Lower Side in the case of the "C" key is as follows.

With such setting, the third row for the "C" key in the table of FIG. 19 is completed.

Details of Delay Setting for Upper Side

Figure 5A:
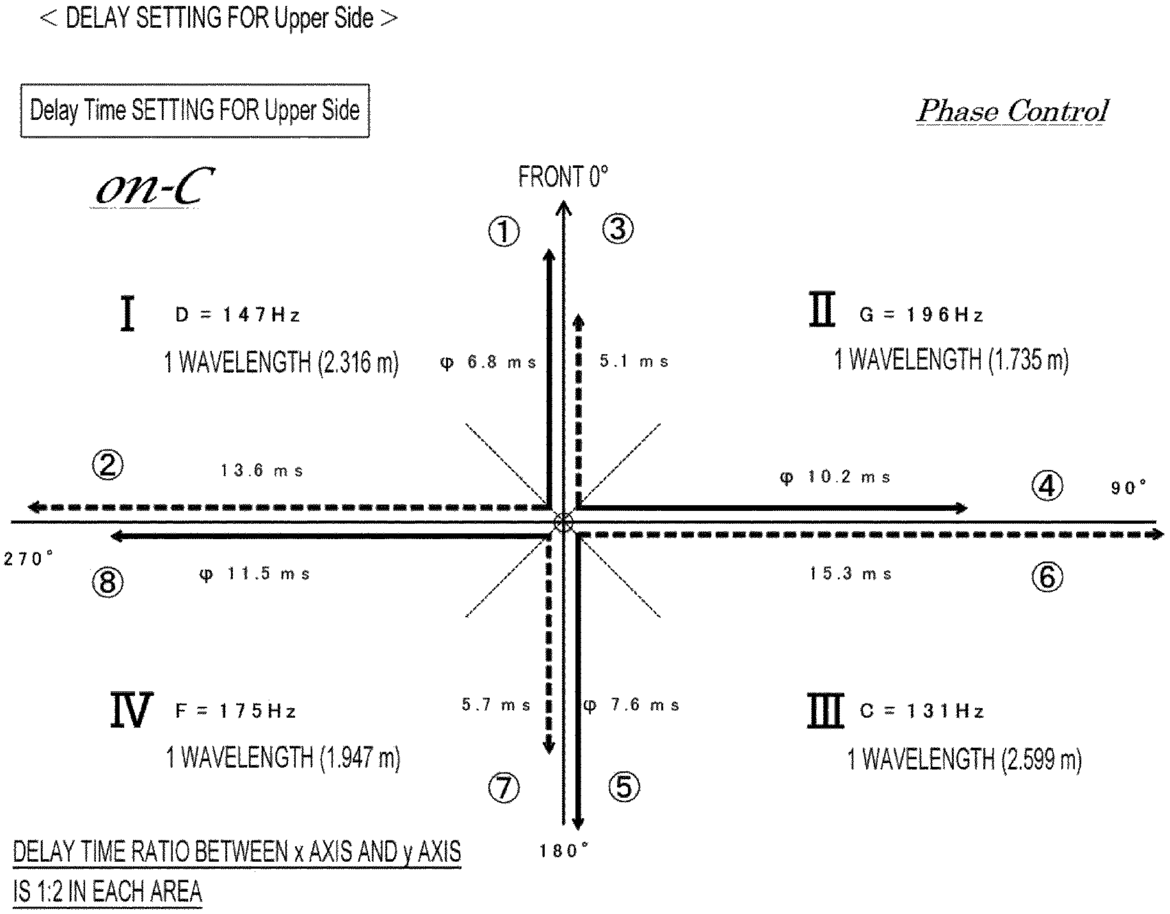
FIG. 5A shows a portion (upper stage side) of a conceptual diagram of the phase delay control according to one embodiment of the present invention.
Figure 5B:
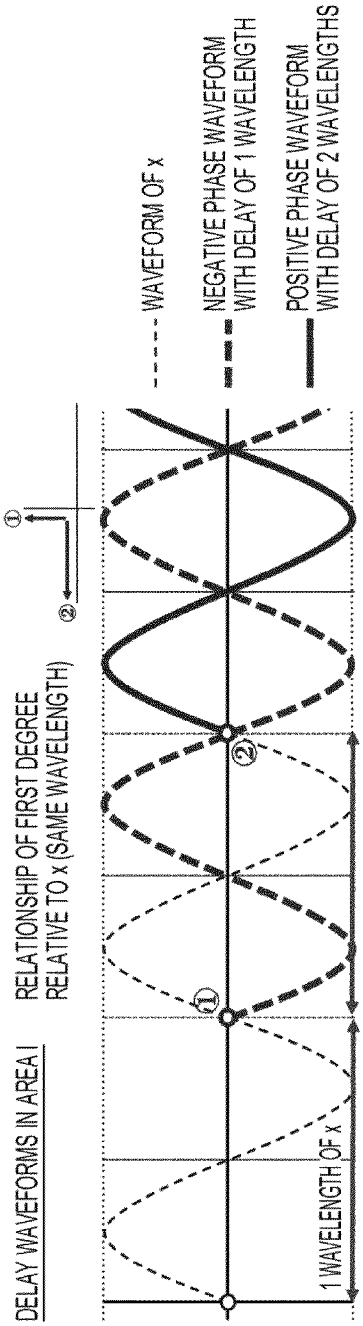
FIG. 5B shows the phase delay control according to one embodiment of the present invention, and shows delay waveforms in an area I.
Figure 5C:
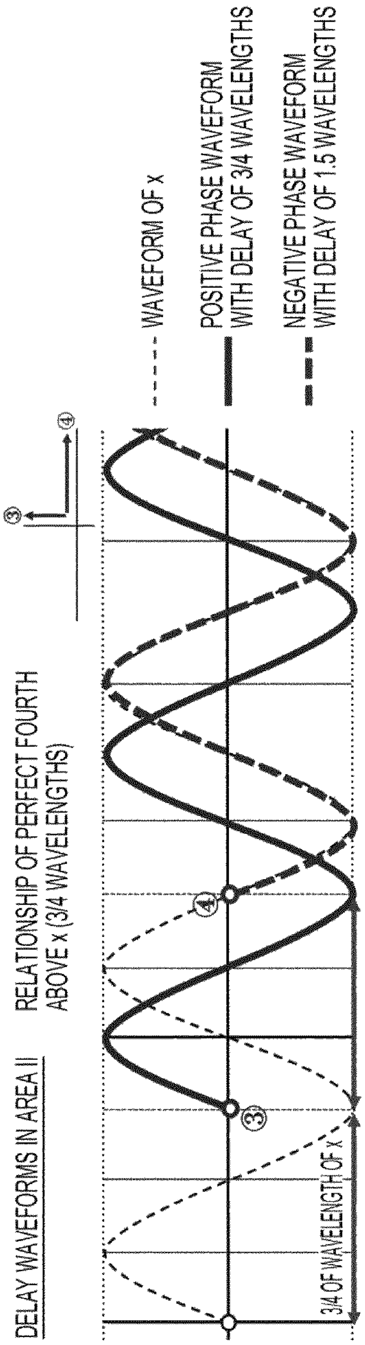
FIG. 5C shows the phase delay control according to one embodiment of the present invention, and shows delay waveforms in an area II.
Figure 5D:
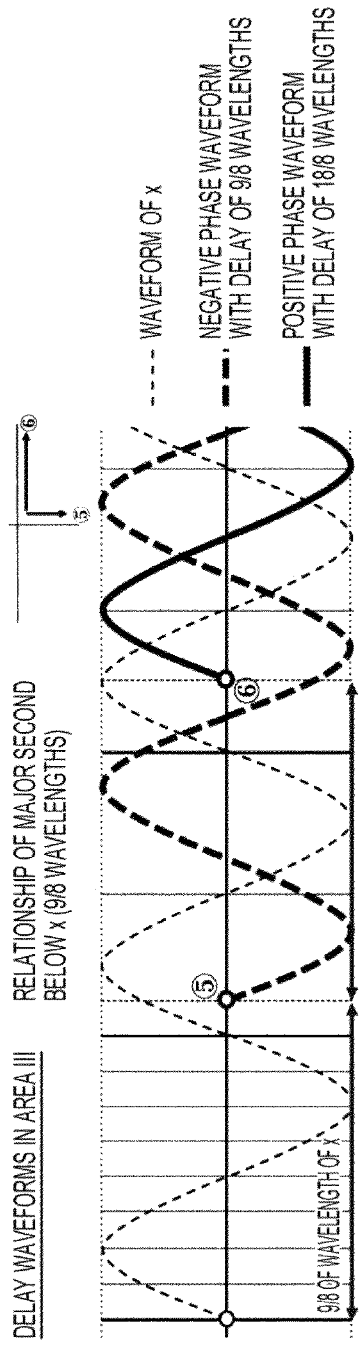
FIG. 5D shows the phase delay control according to one embodiment of the present invention, and shows delay waveforms in an area III.
Figure 5E:
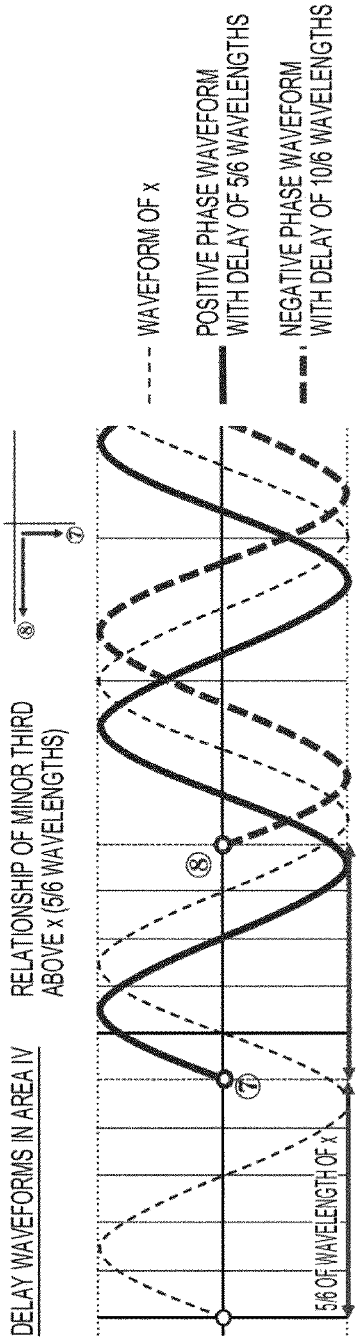
FIG. 5E shows the phase delay control according to one embodiment of the present invention, and shows delay waveforms in an area IV.

FIG. 5A shows delay values, on the Upper Side, of music having the "C" key described in the previous example. In the graph, "a solid line shows a positive phase", and "a dotted line shows a negative phase".

Delay Setting for Upper Side

The delay waveform with respect to "sound source x" in each area of the Upper Side can be described as shown in FIG. 20 based on the ratio of the just interval.

The delay setting shown in FIG. 20 allows creation of left and right spaces in a symmetrical manner, and provides a basic impulse response for depicting a 360-degree space.

Delay Waveforms in Areas I, II

The area I has a relationship of a unison relative to the sound source x and has time for 1 wavelength and 2 wavelengths, so that a delay (negative phase) of (1) has a waveform in which the phase is shifted by 180 degrees from the phase of x. A delay (positive phase) of (2) has a waveform of the same phase with a delay of 2 wavelengths. A phase shift in this area is generated by combining these two phase delay controls.

The area II has a relationship of a perfect fourth above x, and has 3/4 of the wavelength of x. A delay (positive phase) of (3) causes a sound source to be output with a delay corresponding to 3/4 of the wavelength of x, and a delay (negative phase) of (4) causes a sound source to be output with a delay corresponding to 1.5 wavelengths, which is two times 3/4 of the wavelength of x. What should be focused on here is that, when the delay waveform (positive phase) of (2) and the delay waveform (negative phase) of (4) are superposed, the same trajectory (same phase) as the sound source x is drawn. That is, delays with the same phase are present on the left and right of the y axis, and symmetrical phase patterns are obtained with the frequency of the sound source x. A phase shift in this area is generated by combining these two phase delay controls.

Delay Waveforms in Areas III, IV

The areas III, IV are located on the rear side on the plane coordinates of 360 degrees, and the settings (phase difference) of the areas III, IV significantly affects the reproduction of a 3D space.

In the same manner as the above-mentioned ratio of 4:3 between the area I and the area II, the ratio between the area III and the area IV is also 4:3. Based on setting table for Upper Side of FIG. 15, a value that is a fifth below a value in the area II is input into the area III, and a value that is a fourth above the value in the area III is input into the area IV.

The area III has a value a "major second below" the sound source x, and a delay (negative phase) of (5) causes a sound to be output with a delay corresponding to 9/8 of the wavelength of x and a delay (positive phase) of (6) causes a sound to be output with a delay corresponding to 18/8 of the wavelength of x. A phase shift in this area is generated by combining these two phase delay controls.

The area IV has a value a "minor third above" the sound source x, and a delay (positive phase) of (7) causes a sound to be output with a delay corresponding to 5/6 wavelengths and a delay (negative phase) of (8) causes a sound to be output with a delay corresponding to 10/6 wavelengths. A phase shift in this area is generated by combining these two phase delay controls.

Delay Waveform on Upper Side

Figure 5F:
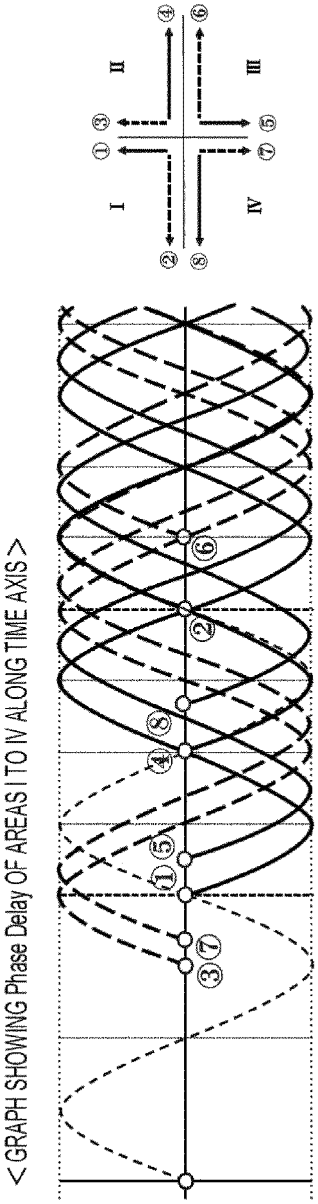
FIG. 5F shows the phase delay control according to one embodiment of the present invention, and shows the delay waveforms in the areas I to IV.

In FIG. 5F, delay waveforms (1) to (8) of the areas I to IV are arranged along a time axis. What should be focused on here is a phase difference between the respective delays (waveforms). The delay of (2), which is on the left, and the delay of (4), which is on the right, have the same phase as the sound source x having the fundamental tone, and there is a phase difference of 90 degrees between (1) and (3) on the x axis, between (2) and (3), and between (3) and (4). The phase difference of 90 degrees is particularly important when a difference in sound is perceived, and Plomp & Steeneken (1969) found the following. As a result of an experiment in which subjects are made to listen to complex sounds having a constant sound volume and pitch but with shifted phases, a pair of complex sounds having a phase difference of 90 degrees have the largest difference in timbre.

However, delay waveforms calculated with respect to the frequency of the sound source x are used in this example and hence, when the frequency of the sound source changes, a phase angle also changes as a matter of course. However, delay values are fixed values, thus being the numerical values effective for sound sources having various notes or overtones.

Delay Setting for Lower Side

Figure 6A:
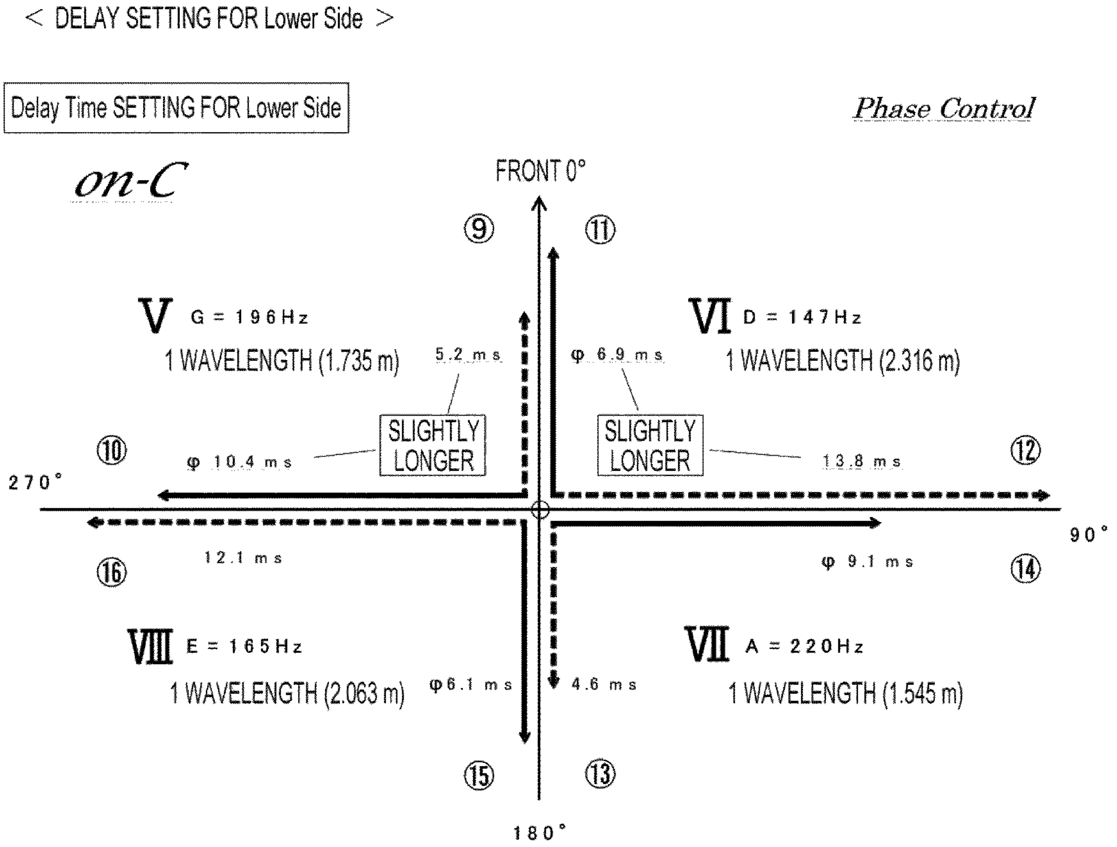
FIG. 6A shows a portion (lower stage side) of the conceptual diagram of the phase delay control according to one embodiment of the present invention.
Figure 6B:
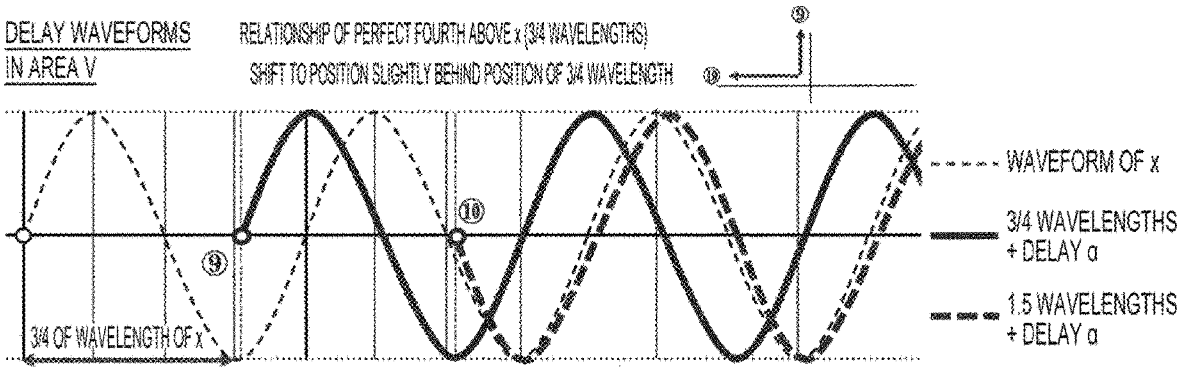
FIG. 6B shows the phase delay control according to one embodiment of the present invention, and shows delay waveforms in an area V.
Figure 6C:
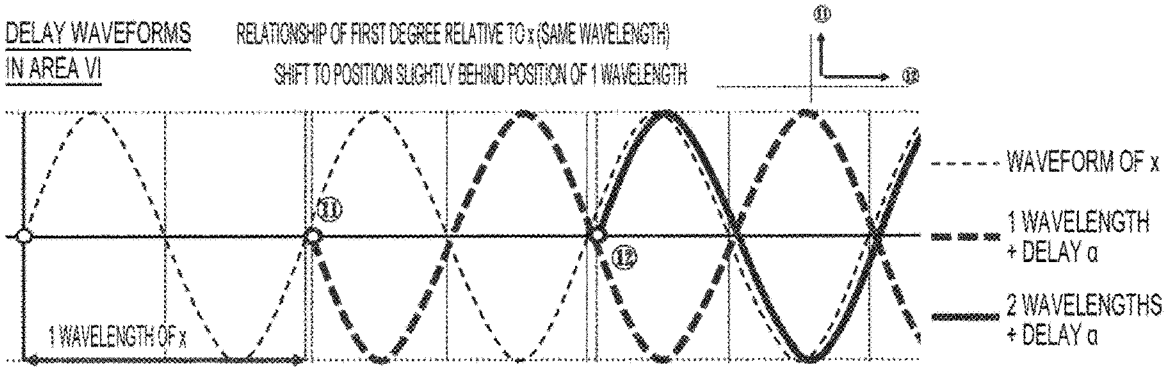
FIG. 6C shows the phase delay control according to one embodiment of the present invention, and shows delay waveforms in an area VI.
Figure 6D:
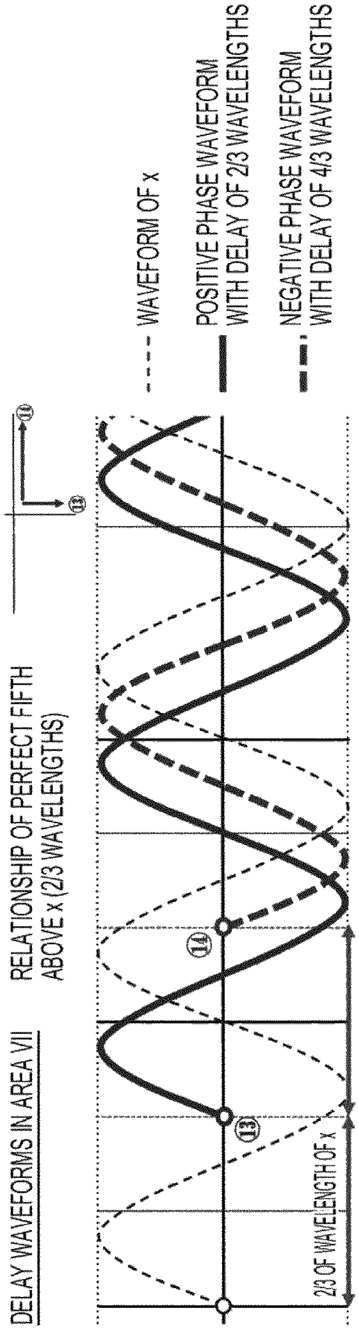
FIG. 6D shows the phase delay control according to one embodiment of the present invention, and shows delay waveforms in an area VII.
Figure 6E:
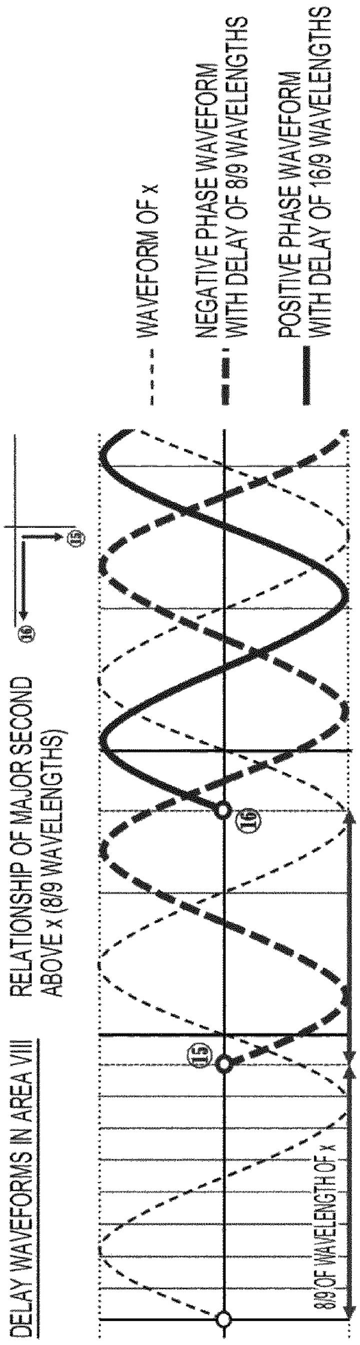
FIG. 6E shows the phase delay control according to one embodiment of the present invention, and shows delay waveforms in an area VIII.

FIG. 6A shows delay values, for the Lower Side, of a music having a key of "C" in the same manner as the Upper Side, and the above-mentioned setting for the Upper Side is superposed on this delay setting.

As described in "delay setting for Lower Side", settings of the areas V, VI are obtained by inverting the settings of the areas I, II.

The delay waveforms with respect to "the sound source x" in the respective areas of the Lower Side can be described based on a just interval table as shown in FIG. 21.

While the delay setting for Upper Side is made in order to provide a basic impulse response that depicts a 360-degree space, the delay setting for Lower Side is made in order to add "persuasiveness" to the basic space.

The setting for "persuasiveness" is the setting that is made in order to allow a listener to feel a 360-degree space more naturally, and is to add a phase shift in which "phases are not modified for a front space" and ""rear feeling" can be increased for a rear space". When a method for achieving "phases are not modified for a front space" is described in a different way, control is performed such that a base note (frequency) is subjected to the delay process to have a delay corresponding to a wavelength slightly longer than 3/4 wavelengths, thus having a phase delay of slightly less than −90 degrees produced by a positive phase component, the base note being the note of the area V a perfect fourth above the note of the area VI and being equal to a second note. In Description of the present application, the term "slightly less than −90 degrees" means that a component in the −90-degree direction is synthesized with a component in the 0-degree direction which is +90 degrees from the −90-degree direction (the component orthogonal to the component in the −90-degree direction), the component in the 0-degree direction being smaller than the component in the −90-degree direction. Specifically, the description of slightly less than −90 degrees used for the eighth note may be a range of less than −90 degrees and more than −70 degrees, and may preferably be a range of less than −85 degrees and more than −80 degrees. Further, control is performed such that the above-described note of the area VI is subjected to the delay process to have a delay corresponding to a wavelength slightly longer than 1.5 wavelengths, thus having a phase delay of slightly more than 0 degrees produced by a negative phase component. By combining these two phase delay controls, a slight phase shift is generated between the area II (right ear side) and the area V (left car side) on the front side. In Description of the present application, the term "slightly more than 0 degrees" means that a component in the 0-degree direction is synthesized with a component in the 90-degree direction which is +90 degrees from the 0-degree direction (the component orthogonal to the component in the 0-degree direction), the component in the 90-degree direction being smaller than the component in the 0-degree direction. Specifically, the range of the numerical value is more than 0 degrees and less than 45 degrees. However, in practice, the range of the numerical value may be a range of more than 0 degrees and less than 20 degrees, and may preferably be a range of more than 5 degrees and less than 10 degrees. The reason is as follows. When phase delays are set to exactly −90 degrees (not slightly less than −90 degrees) and to exactly 0 degrees (not slightly more than 0 degrees), the same setting as the above-mentioned second note (right ear side) is made on the left ear side, thus causing a monaural phenomenon. However, by generating the slight phase shift as described above, it is possible to achieve the purpose of avoiding the monaural phenomenon and it is possible to obtain an advantageous effect of increasing front feeling due to minimization of the phase shift.

The most important point in the setting for the Lower Side is to set phases opposite to the phases of the Upper Side in all directions. For example, (1) and (9) indicate the same direction as viewed in the vertical direction, and (2) and (10) indicate the same direction as viewed in the vertical direction. However, (1) and (9) have opposite phases, and (2) and (10) have opposite phases. The description of waveform starting from the following paragraph will be made in the form of going back from the area VIII to the area V.

Delay Waveforms in Areas VII, VIII

The delay setting in these areas is setting that causes a lister to feel "the rear side", thus being particularly important.

The areas VII, VIII are located on the rear side of the Lower Side, and are located directly below the areas III, IV of the Upper Side. The role of the delay setting of these areas is to further "add persuasiveness" to the areas III, IV, which are important to provide rear feeling.

The area VIII being the starting point of the setting has a note a major second (two semitones) above x and has 8/9 wavelengths. The point is that a phase difference between the area VIII and the area I (X axis) decreases, that is, 40 degrees. The area VIII and the area I, having the fundamental tone, have a front-rear relationship on the left side (the upper left front side and the lower left rear side).

A delay of (15) causes a sound to be output with a delay corresponding to 8/9 wavelengths, and a delay of (16) causes a sound to be output with a delay corresponding to 16/9 wavelengths.

The area VII has a value a perfect fourth above the value of the area VIII. The area VII has a relationship of a perfect fifth above x, and has 2/3 wavelengths.

A delay of (13) causes a sound to be output with a delay corresponding to 2/3 wavelengths, and a delay of (14) causes a sound to be output with a delay corresponding to 4/3 wavelengths.

The ratio of wavelength between the area VIII and VII is 4:3 (see "Ratio of phase delay between areas").

Delay Waveforms in Areas V, VI

The area VI have a value a fifth below a value of the area VII, and is equal to the value of the area I having the fundamental tone. Further, a value a perfect fourth above the value of the area VI is equal to the value of the area II. That is, the areas V and VI on the front side of the Lower Side as shown in FIG. 22 are areas obtained by inverting the notes set in "the area I" and "the area II". The purpose of such setting is to "align phases".

As described above, when the (0127) area V and the area II have the same numerical value, the monaural phenomenon occurs, thus impairing spread feeling. For this reason, in actually making the setting, it is necessary to perform a fine adjustment in order to have a slightly greater value in terms of acoustic feeling.

This "fine adjustment" is especially important. A fine adjustment of time is performed within the range of a semitone. For example, a difference in delay time between Note No. 47 B and C a semitone above the Note No. 47 B is extremely small, that is, 0.46 ms. However, by making the setting within such a range, it is possible to create "a sound image localized on the front side" without significantly modifying phases on the front side. When a method for achieving the "fine adjustment" is described in a different way, control is performed such that a base note (frequency) is subjected to the delay process to have a delay corresponding to a wavelength slightly longer than 1 wavelength, thus having a phase delay of slightly more than 180 degrees produced by a negative phase component, the base note being a note (frequency) of the area VI a perfect fifth below the note of the area VII and being equal to the note of the area I. In Description of the present application, the term "slightly more than 180 degrees" means that a component in the 180-degree direction is synthesized with a component in the 270-degree direction which is +90 degrees from the 180-degree direction (the component orthogonal to the component in the 180-degree direction), the component in the 270-degree direction being smaller than the component in the 180-degree direction. Specifically, the range of the numerical value is more than 180 degrees and less than 225 degrees. However, in practice, the range of the numerical value may be a range of more than 180 degrees and less than 200 degrees, and may preferably be a range of more than 185 degrees and less than 190 degrees. Further, control is performed such that the above-described note of the area VI is subjected to the delay process to have a delay corresponding to a wavelength slightly longer than 2 wavelengths, thus having a phase delay of slightly more than 0 degrees produced by a positive phase component. By combining these two phase delay controls, a slight phase shift is generated between the area I (left ear side) and the area VI (right ear side) on the front side. In Description of the present application, the term "slightly more than 0 degrees" means that a component in the 0-degree direction is synthesized with a component in the 90-degree direction which is +90 degrees from the 0-degree direction (the component orthogonal to the component in the 0-degree direction), the component in the 90-degree direction being smaller than the component in the 0-degree direction. Specifically, the range of the numerical value is more than 0 degrees and less than 45 degrees. However, in practice, the range of the numerical value may be a range of more than 0 degrees and less than 20 degrees, and may preferably be a range of more than 5 degrees and less than 10 degrees. The reason is as follows. When phase delays are set to exactly 180 degrees (not slightly more than 180 degrees) and exactly 0 degrees (not slightly more than 0 degrees), the same setting as the above-mentioned first note (left ear side) is made on the right ear side, thus causing a monaural phenomenon. However, by generating the slight phase shift as described above, it is possible to achieve the purpose of avoiding the monaural phenomenon and it is possible to obtain an advantageous effect of increasing front feeling due to minimization of the phase shift.

The area V has a relationship of a perfect fourth above the sound source x (3/4 of the wavelength of x) and hence, the delays in the area V correspond to the delays of (3), (4) in the area II in a left-right relationship. In the same manner, the delays in the area VI correspond to the delays of (1), (2) in the area I in a left-right relationship. As described above, an extremely slight delay is applied to both the area V and the area VI to create a front space.

Lastly, the above-described eight notes are synthesized, thus generating a stereophonic sound.

Setting of Units of Sample

The description has been made heretofore with units of "milliseconds" since "millisecond" is used in delay machines in general and can be intuitively easily understood. However, fine setting of the second decimal place or lower cannot be made in normal delay machines. Accordingly, on actual sites, AAX plugin "time adjuster" from "Avid Pro tools" is used that enables setting with "units of sample".

Examples of "sample"=sampling frequency include "48 KHz" describing one second in terms of 1/48,000 and "96 KHz" describing one second in terms of 1/96,000. The greater numerical value allows finer setting.

The table shown in FIG. 23 is a table obtained by adding wavelength numerical values calculated at a sampling frequency of 48 KHz (1/48,000) to "Table of wavelength and period of note" of FIG. 12. However, delay values on the right side of the table can be input into an actual delay machine up to the first decimal place. However, when a time adjuster is used that can input with the units of sample, it is possible to generate a finer phase difference.

The description has been made for the method for making settings of the sixteen delay machines, which are set in eight divided areas in the two layers. An extremely short delay resembling an impulse response is applied to a sound source, and the phase of the sound source is effectively shifted. With such operations, it is possible to support a sense of localization of 360 degrees. Such an impulse response based on an extremely short delay time can be positioned as a phase controller for supporting localization rather than room reflection.

Embodiment 2

In addition to the processes shown in FIG. 2, a process of generating and synthesizing an overtone of a note to be delayed may be added.

When a frequency changes, a phase pattern also changes variously. At 294 Hz (D 1 octave above), being the second overtone of D (147 Hz), the phase of the overtone changes to an opposite phase at a position at which the phase of original D is 180 degrees.

Every sound is a group of sine waves. A difference is made in timbre of sound by a complex frequency pattern created by an overtone. The present inventor has found that the reflection pattern (the above-mentioned delay setting) in which the fundamental tone and the second overtone have opposite phases as described above is extremely effective in changing echoes in a space in a complicated manner and especially in supporting a sense of localization on the rear side.

Embodiment 3

In the above-described embodiment, the description has been made for the phase delay control in the X axis direction and the Y axis direction in eight divided areas. However, by applying the present invention, it is possible to reproduce a more detailed space by performing phase delay control in more directions (eight or more directions, for example).

Figures 7, 8:
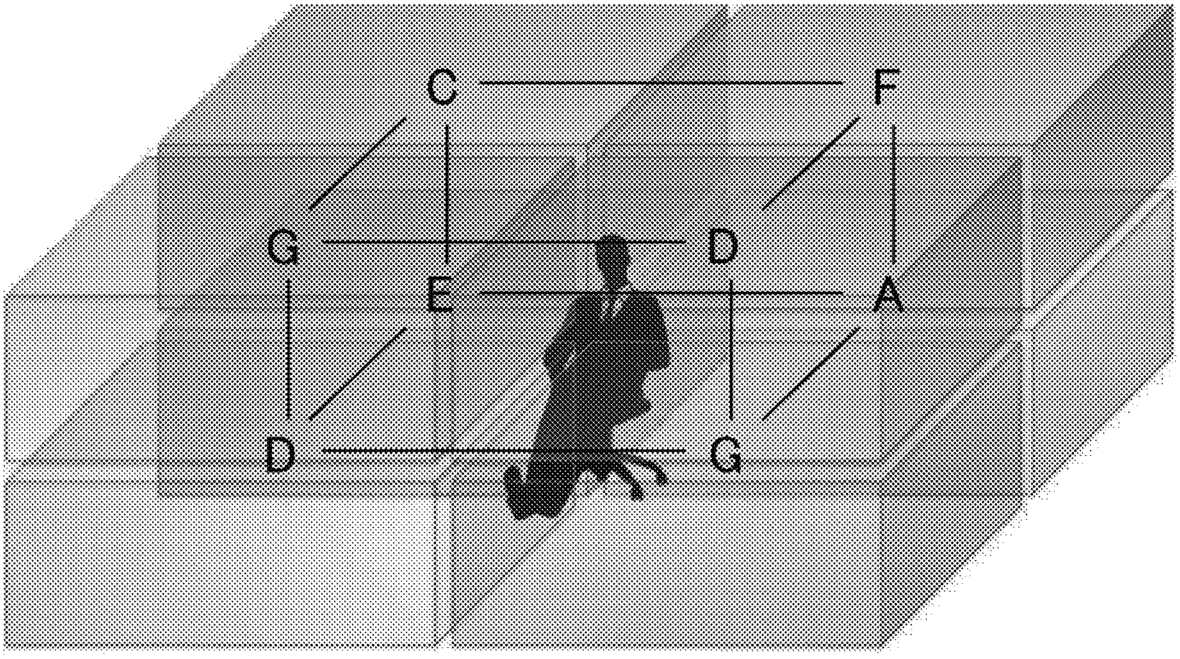
FIG. 7 is a conceptual diagram of a sound generating method that can reproduce pseudo-reflection in multi-directions (eight directions) by using one embodiment of the present invention.
FIG. 8 shows one example of a table showing the relationship between notes.

FIG. 7 is a conceptual diagram of a sound generating method that can recreate pseudo-reflection in multi-directions (eight directions) by using one embodiment of the present invention.

FIG. 5A and FIG. 6A are conceptual diagrams of the phase delay control according to one embodiment of the present invention, and are diagrams describing the conceptual diagram in FIG. 7 from a viewpoint of phase delay control. FIG. 5A shows one example of a concept of the upper stage side in FIG. 7, and FIG. 6A shows one example of a concept of the lower stage side in FIG. 7.

In FIG. 5A and FIG. 6A, a center point (indicated by a circle) is a listening point (a point at which the head of a human is present, for the sake of convenience, the left and right ears are present).

Embodiment 4

An embodiment 4 is an embodiment obtained by developing the embodiment 1.

(Compared with the embodiment 1,) in the embodiment 4, although the area II and the area III has a relationship of a perfect fourth (actually, a relationship of a fourth caused by descending a fifth), the area IV and the area I do not have a relationship of a perfect fourth. However, the present inventor has found that what is particularly important as delay time setting values for achieving front and rear feeling is the ratio between left and right. That is, the inventor has found that when the area II has a relationship of a perfect fourth relative to the area I and when the area IV has a relationship of a perfect fourth relative to the area III, it is possible to maintain left-right symmetry (symmetry).

As a developed example of the embodiment 4, a wavelength of a note one semitone higher or a wavelength of a note one semitone lower, for example, may be applied to the area III and the area IV while maintaining a relationship of a perfect fourth.

As another developed example, the present inventor has found that even in cases other than the case in which the area 2 has a relationship of a perfect fourth relative to the area 1 and the area 4 has a relationship of a perfect fourth relative to the area 3, it is possible to maintain left-right symmetry (symmetry). For example, the description will be made for the case in which the area 2 has a relationship of a major third relative to the area 1 and the area 4 has a relationship of a major third relative to the area 3. The reason why symmetry is maintained is that the ratio of frequency between the fundamental tone and the major third is constant (integer ratio of 5 to 4). When those skilled in the art reads this specification, it is possible to understand that the present invention is also applicable to music or a sound source containing complex overtones even in cases other than the case of the relationship of a perfect fourth.

By merely adopting such setting values from FIG. 24 for the sixteen delay machines set in two layers, it is possible to support a sense of localization effective for the original sound. Further, initial reflection due to such an extremely short delay time is not heard as room reflection, thus being also effective in creating a more realistic artwork or in suppressing room reflection as much as possible.

In the conventional way of thinking of reproducing a 3D space, a binaural room impulse response (BRIR) is always necessary, and the 3D space is reproduced based on the room reflection. However, such a technique causes a phenomenon of "the sound source becoming located at a farther position" due to room reflection, thus impairing the degree of freedom in creating artworks.

The BRIR is a room impulse response measured by using a dummy head or the like, and represents an acoustic transfer coefficient for the range from a sound source to both ears in the sound field in the room.

In contrast, an 8-Way Phase control of the present invention not only is the only tool that can create 3D artworks with less room feeling, but also changes the basis of 3D mixing, thus being a production tool that can be easily handled by anyone.

The embodiments of the present invention have been described heretofore. However, those skilled in the art can make various alternatives, modifications, or variations based on the above-mentioned description, and the present invention includes the above-mentioned alternatives, modifications, and variations without departing from the gist of the present invention.

What is claimed is:

1. A method for generating a stereophonic sound by performing phase delay control, the method comprising:

a step of obtaining an acoustic signal having a base note on a right ear side and an acoustic signal having a base note on a left ear side; and a step of determining to control a phase of either one of the acoustic signal obtained on the right ear side and having a note or the acoustic signal obtained on the left ear side and having a note, wherein the acoustic signal having the base note to be delayed is further subjected to a step of generating an acoustic signal that is derived from a frequency of the acoustic signal having the base note and that has a first phase shift generated by performing a first phase delay process on the acoustic signal having the base note, a step of generating an acoustic signal that is derived from the acoustic signal having the base note and that has a second phase shift generated by performing a second phase delay process on the acoustic signal having the base note, a step of generating an acoustic signal that is derived from a frequency of an acoustic signal having a note a perfect fourth above the base note and that has a third phase shift generated by performing a third phase delay process on the acoustic signal having the base note, a step of generating an acoustic signal that is derived from the frequency of the acoustic signal having the note the perfect fourth above the base note, and that has a fourth phase shift generated by performing a fourth phase delay process on the acoustic signal having the base note, and a step of synthesizing the acoustic signal obtained and having the base note, the acoustic signal having the first phase shift, the acoustic signal having the second phase shift, the acoustic signal having the third phase shift, and the acoustic signal having the fourth phase shift.

2. The method according to claim 1, further comprising a step of synthesizing an overtone of the note to be delayed.

3. A method for generating a stereophonic sound by a phase delay control device including four areas, the method comprising:

a step of obtaining an acoustic signal having a base note on a right ear side and an acoustic signal having a base note on a left ear side; and a step of determining to control a phase of either one of the acoustic signal obtained on the right ear side and having a note or the acoustic signal obtained on the left ear side and having a note, wherein the acoustic signal having the base note to be delayed is further subjected to a step of generating an acoustic signal that is derived from a frequency of the acoustic signal having the base note and that has a first phase shift generated by performing 180 degree phase delay control and 0 degree phase delay control, the 180 degree phase delay control being produced by a negative phase component obtained by performing a delay process for a delay corresponding to 1 wavelength, the 0 degree phase delay control being produced by a positive phase component obtained by performing a delay process for a delay corresponding to 2 wavelengths, a step of generating an acoustic signal that is derived from a frequency of an acoustic signal having a second note a perfect fourth above the base note and that has a second phase shift generated by performing −90 degree phase delay control and 0 degree phase delay control, the −90 degree phase delay control being produced by a positive phase component obtained by performing a delay process for a delay corresponding to 3/4 wavelengths on the acoustic signal having the base note, the 0 degree phase delay control being produced by a negative phase component obtained by performing a delay process for a delay corresponding to 1.5 wavelengths on the acoustic signal having the base note, a step of generating an acoustic signal that is derived from a frequency of an acoustic signal having a third note a perfect fifth below the second note and that has a third phase shift generated by performing −135 degree phase delay control and 90 degree phase delay control, the −135 degree phase delay control being produced by a negative phase component obtained by performing a delay process for a delay corresponding to 9/8 wavelengths on the acoustic signal having the base note, the 90 degree phase delay control being produced by a positive phase component obtained by performing a delay process for a delay corresponding to 18/8 wavelengths on the acoustic signal having the base note, a step of generating an acoustic signal that is derived from a frequency of an acoustic signal having a fourth note a perfect fourth above the third note and that has a fourth phase shift generated by performing −60 degree phase delay control and 60 degree phase delay control, the −60 degree phase delay control being produced by a positive phase component obtained by performing a delay process for a delay corresponding to 5/6 wavelengths on the acoustic signal having the base note, the 60 degree phase delay control being produced by a negative phase component obtained by performing a delay process for a delay corresponding to 10/6 wavelengths on the acoustic signal having the base note, and a step of synthesizing the acoustic signal having the base note, the acoustic signal having the first phase shift, the acoustic signal having the second phase shift, the acoustic signal having the third phase shift, and the acoustic signal having the fourth phase shift.

4. A device comprising means for performing the respective steps of claim 1.

5. A non-transitory computer-readable medium storing instructions that, when executed by a processor, cause the processor to perform the method of claim 1.

6. A method for generating a stereophonic sound by a phase delay control device including eight areas, the method comprising:

a step of obtaining an acoustic signal having a base note on a right ear side and an acoustic signal having a base note on a left ear side; and a step of determining to control a phase of either one of the acoustic signal obtained on the right ear side and having a note or the acoustic signal obtained on the left ear side and having a note, wherein the acoustic signal having the base note to be delayed is further subjected to a step of generating an acoustic signal that is derived from a frequency of the acoustic signal having the base note and that has a first phase shift generated by performing 180 degree phase delay control and 0 degree phase delay control, the 180 degree phase delay control being produced by a negative phase component obtained by performing a delay process for a delay corresponding to 1 wavelength, the 0 degree phase delay control being produced by a positive phase component obtained by performing a delay process for a delay corresponding to 2 wavelengths, a step of generating an acoustic signal that is derived from a frequency of an acoustic signal having a second note a perfect fourth above the acoustic signal having the base note and that has a second phase shift generated by performing −90 degree phase delay control and 0 degree phase delay control, the −90 degree phase delay control being produced by a positive phase component obtained by performing a delay process for a delay corresponding to 3/4 wavelengths on the acoustic signal having the base note, the 0 degree phase delay control being produced by a negative phase component obtained by performing a delay process for a delay corresponding to 1.5 wavelengths on the acoustic signal having the base note, a step of generating an acoustic signal that is derived from a frequency of an acoustic signal having a third note a perfect fifth below the second note and that has a third phase shift generated by performing −135 degree phase delay control and 90 degree phase delay control, the −135 degree phase delay control being produced by a negative phase component obtained by performing a delay process for a delay corresponding to 9/8 wavelengths on the acoustic signal having the base note, the 90 degree phase delay control being produced by a positive phase component obtained by performing a delay process for a delay corresponding to 18/8 wavelengths on the acoustic signal having the base note, a step of generating an acoustic signal that is derived from a frequency of an acoustic signal having a fourth note a perfect fourth above the third note and that has a fourth phase shift generated by performing −60 degree phase delay control and 60 degree phase delay control, the −60 degree phase delay control being produced by a positive phase component obtained by performing a delay process for a delay corresponding to 5/6 wavelengths on the acoustic signal having the base note, the 60 degree phase delay control being produced by a negative phase component obtained by performing a delay process for a delay corresponding to 10/6 wavelengths on the acoustic signal having the base note, a step of generating an acoustic signal that is derived from a frequency of an acoustic signal having a fifth note a major second above the base note and that has a fifth phase shift generated by performing 140 degree phase delay control and −80 degree phase delay control, the 140 degree phase delay control being produced by a negative phase component obtained by performing a delay process for a delay corresponding to 8/9 wavelengths on the acoustic signal having the base note, the −80 degree phase delay control being produced by a positive phase component obtained by performing a delay process for a delay corresponding to 16/9 wavelengths on the acoustic signal having the base note, a step of generating an acoustic signal that is derived from a frequency of an acoustic signal having a sixth note a perfect fourth above the fifth note and that has a sixth phase shift generated by performing −120 degree phase delay control and −60 degree phase delay control, the −120 degree phase delay control being produced by a positive phase component obtained by performing a delay process for a delay corresponding to 2/3 wavelengths on the acoustic signal having the base note, the −60 degree phase delay control being produced by a negative phase component obtained by performing a delay process for a delay corresponding to 4/3 wavelengths on the acoustic signal having the base note, a step of generating an acoustic signal that is derived from a frequency of an acoustic signal having a seventh note a perfect fifth below the sixth note and that has a seventh phase shift generated by performing slightly-more-than-180-degree phase delay control and slightly-more-than-0-degree phase delay control, the slightly-more-than-180-degree phase delay control being produced by a negative phase component obtained by performing a delay process for a delay corresponding to a wavelength slightly longer than 1 wavelength on the acoustic signal having the base note equal to a first note, the slightly-more-than-0-degree phase delay control being produced by a positive phase component obtained by performing a delay process for a delay corresponding to a wavelength slightly longer than 2 wavelengths on the acoustic signal having the base note equal to the first note, a step of generating an acoustic signal that is derived from a frequency of an acoustic signal having an eighth note a perfect fourth above the seventh note and that has an eighth phase shift generated by performing slightly-less-than--90-degree phase delay control and slightly-more-than-0-degree phase delay control, the slightly-less-than--90-degree phase delay control being produced by a positive phase component obtained by performing a delay process for a delay corresponding to a wavelength slightly longer than 3/4 wavelengths on the acoustic signal having the base note equal to the second note, the slightly-more-than-0-degree phase delay control being produced by a negative phase component obtained by performing a delay process for a delay corresponding to a wavelength slightly longer than 1.5 wavelengths on the acoustic signal having the base note equal to the second note, and a step of synthesizing the acoustic signal having the base note, the acoustic signal having the first phase shift, the acoustic signal having the second phase shift, the acoustic signal having the third phase shift, the acoustic signal having the fourth phase shift, the acoustic signal having the fifth phase shift, the acoustic signal having the sixth phase shift, the acoustic signal having the seventh phase shift, and the acoustic signal having the eighth phase shift.

7. A method for generating a stereophonic sound by performing phase delay control, the method comprising:

a step of obtaining an acoustic signal having a base note on a right ear side and an acoustic signal having a base note on a left ear side; and a step of determining to control a phase of either one of the acoustic signal obtained on the right ear side and having a note or the acoustic signal obtained on the left ear side and having a note, wherein a step of generating an acoustic signal that is derived from a frequency of the acoustic signal having the base note and that has a first phase shift generated by performing a first phase delay process on the acoustic signal having the base note, a step of generating an acoustic signal that is derived from the acoustic signal having the base note and that has a second phase shift generated by performing a second phase delay process on the acoustic signal having the base note, a step of generating an acoustic signal that is derived from a frequency of an acoustic signal having a note different from the base note and that has a third phase shift generated by performing a third phase delay process on the acoustic signal having the base note, a step of generating an acoustic signal that is derived from the frequency of the acoustic signal having the note different from the base note and that has a fourth phase shift generated by performing a fourth phase delay process on the acoustic signal having the base note, and a step of synthesizing the acoustic signal obtained and having the base note, the acoustic signal having the first phase shift, the acoustic signal having the second phase shift, the acoustic signal having the third phase shift, and the acoustic signal having the fourth phase shift are further performed on the acoustic signal having the base note to be delayed.

* * * * *